US010462142B2

(12) United States Patent
Pattar et al.

(10) Patent No.: US 10,462,142 B2
(45) Date of Patent: *Oct. 29, 2019

(54) TECHNIQUES FOR IMPLEMENTING A DATA STORAGE DEVICE AS A SECURITY DEVICE FOR MANAGING ACCESS TO RESOURCES

(71) Applicant: Oracle International Corporation, Redwood Shores, CA (US)

(72) Inventors: Nagaraj Pattar, Gulbarga (IN); Harsh Maheshwari, Indore (IN)

(73) Assignee: Oracle International Corporation, Redwood Shores (*) Notice: Subject to any disclaimer, the term of this patent is extended or adjusted under 35 U.S.C. 154(b) by 0 days.

This patent is subject to a terminal disclaimer.

(21) Appl. No.: 16/183,047

(22) Filed: Nov. 7, 2018

(65) Prior Publication Data
US 2019/0089708 A1    Mar. 21, 2019

Related U.S. Application Data

(63) Continuation of application No. 15/466,512, filed on Mar. 22, 2017, now Pat. No. 10,154,037.

(51) Int. Cl.
*H04L 29/06*    (2006.01)
(52) U.S. Cl.
CPC .......... *H04L 63/10* (2013.01); *H04L 63/0435* (2013.01); *H04L 63/0442* (2013.01); *H04L 63/061* (2013.01)

(58) Field of Classification Search
CPC . H04L 63/10; H04L 63/0435; H04L 63/0442; H04L 63/061; G06F 12/1408; G06F 2212/1052
See application file for complete search history.

(56) References Cited

U.S. PATENT DOCUMENTS 6,185,681 B1 * 2/2001 Zizzi ..................... G06F 21/602
                                              713/165
7,516,483 B2    4/2009 Brennan
(Continued)

FOREIGN PATENT DOCUMENTS

CN    101394276 A    3/2009
CN    103414564 A    11/2013

OTHER PUBLICATIONS

U.S. Appl. No. 15/466,512, Notice of Allowance dated Aug. 8, 2018, 15 pages.

(Continued)

*Primary Examiner* — Ghodrat Jamshidi
(74) *Attorney, Agent, or Firm* — Kilpatrick Townsend & Stockton LLP

(57) ABSTRACT

Techniques are disclosed for implementation of a data storage device as a security device for managing access to resources. These techniques can be implemented for multi-factor authentication (MFA) to provide multiple layers of security for managing access to resources in an enterprise and/or a cloud computing environments. As a security device, a storage device can be used a portable device to provide a point of trust for multi-factor authentication across any client application or device operated to access resources. A storage device may be configured with security data for authentication with an access management system. After configuration, a portable storage device may be used for authentication of a user without credential information at any client device based on accessibility of the device to the portable storage device. A storage device configured as a security device can ensure that legitimate users have an easy way to authenticate and access the resources.

19 Claims, 14 Drawing Sheets

(56) References Cited

U.S. PATENT DOCUMENTS

| | | | |
|---|---|---|---|
| 8,220,039 B2 | 7/2012 | Gonzales et al. | |
| 8,608,057 B1 | 12/2013 | Crews et al. | |
| 8,812,860 B1* | 8/2014 | Bray | G06F 21/34 |
| | | | 713/182 |
| 9,104,889 B1* | 8/2015 | Kiswani | G06F 21/6218 |
| 9,154,958 B2 | 10/2015 | Whitmyer | |
| 9,338,155 B2* | 5/2016 | Quach | H04L 9/3215 |
| 2002/0159601 A1* | 10/2002 | Bushmitch | H04L 29/06 |
| | | | 380/277 |
| 2007/0245144 A1* | 10/2007 | Wilson | G06F 21/6254 |
| | | | 713/170 |
| 2007/0250918 A1 | 10/2007 | Aboual Chamat | |
| 2008/0082813 A1* | 4/2008 | Chow | G06F 21/34 |
| | | | 713/2 |
| 2008/0098481 A1* | 4/2008 | Lee | G06F 21/10 |
| | | | 726/26 |
| 2008/0204192 A1* | 8/2008 | Hamamura | B60R 25/2072 |
| | | | 340/5.72 |
| 2009/0031131 A1 | 1/2009 | Qiu et al. | |
| 2010/0050251 A1* | 2/2010 | Speyer | G06Q 10/06 |
| | | | 726/20 |
| 2012/0011565 A1 | 1/2012 | Garlie et al. | |
| 2014/0230017 A1* | 8/2014 | Saib | H04L 63/0823 |
| | | | 726/4 |
| 2014/0355761 A1* | 12/2014 | Kawamura | H04L 9/0861 |
| | | | 380/270 |
| 2015/0199479 A1* | 7/2015 | Semen | G06Q 50/24 |
| | | | 705/3 |
| 2015/0312242 A1* | 10/2015 | Ogawa | G06F 21/34 |
| | | | 726/6 |

OTHER PUBLICATIONS

"RSA SecurID Hardware Tokens," product datasheet, EMC Corporation (Copyright 2015) 1 page.

"FIDO U2F Security Key," product information, Yubico Inc. (Copyright 2016), 7 pages.

"Secure Storage of Private Keys," product information, Microsoft Corporation (Copyright 2016) 1 page.

"Storage of private key used by subscribers for creating Digital Signatures," certification guidelines, India Ministry of Electronics and Information Technology (May 2005).

"Yubikeys" product information downloaded Jun. 26, 2017, Yubico Inc (copyright 2017) 6 pages.

* cited by examiner

TECHNIQUES FOR IMPLEMENTING A DATA STORAGE DEVICE AS A SECURITY DEVICE FOR MANAGING ACCESS TO RESOURCES

CROSS REFERENCE TO RELATED APPLICATION

This application is a continuation application and claims the benefit and priority of U.S. Non-Provisional application Ser. No. 15/466,512, filed Mar. 22, 2017 entitled "TECHNIQUES FOR IMPLEMENTING A DATA STORAGE DEVICE AS A SECURITY DEVICE FOR MANAGING ACCESS TO RESOURCES," which is herein incorporated by reference in its entirety for all purposes.

BACKGROUND

Generally, the present application relates to data processing. More specifically, the application is related to techniques for multi-factor authentication (MFA).

Modern businesses rely on a variety of applications and systems that control and generate information that is critical to business operations. Different applications often provide different services and information, and different users may require access to different levels of information within each system or application. The level of access that users are granted may depend on the role of the user. For example, a manager may need access to certain information about employees that report to him, but it may be improper for that manager to access the same information about those whom he reports to.

Access management systems are implemented to control access to many different resources. In enterprise and cloud environments, users typically may have access to one or more different systems and applications. Each of these systems and applications may utilize different access control policies and require levels of authentication. An access management system may challenge a user to verify his/her identity to determine access to a resource. The user may be challenged for information based on a combination of "what you have," "what you know," and "who you are." Some access management systems implement multi-factor authentication implementing multiple different methods of authentication to verify a user's identity. Some access management systems determine authentication based on possession of another device. A device for MFA may not be customizable for use with different access management systems and/or resources by multiple users. The device may not be transferable and/or shared by multiple users. Using multiple factors of authentication is gaining ground as a more secure method authentication to prevent fraud.

BRIEF SUMMARY

The present disclosure relates to managing access to resources. Certain techniques are related to implementation of a data storage device (also referred to herein as a "storage device") as a security device for managing access to resources. These techniques can be implemented for multi-factor authentication (MFA) to provide multiple layers of security for managing access to resources in an enterprise and/or a cloud computing environments.

With the rise in use of mobile and portable devices for authentication, techniques disclosed herein enable use of a storage device to operate as a portable device to provide a point of trust for multi-factor authentication across any client application or device operated to access resources. A storage device may be configured with security data for authentication with an access management system. After configuration, a portable storage device may be used for authentication of a user without credential information at any client device based on accessibility of the device to the portable storage device. A storage device configured as a security device can ensure that legitimate users have an easy way to authenticate and access the resources.

Certain embodiments of this disclosure enable a storage device to be configured with security data to enable the storage device to operate as hardware-based token for authentication at a device. By storing security data on a storage device, unauthorized users may not be able to detect that the storage device is a hardware-based token being used for authentication. In some embodiments, a user, through a graphical interface, can configure and manage storage devices as hardware tokens. A user can re-create the security data on multiple storage devices for convenience and/or if any one of those storage devices is lost or damaged. The security data can be stored in a secure manner such that the storage device can still be used for its intended purpose (e.g., storage). By providing a mechanism to create and manage security data on a storage device, a user may not be limited to a single storage device dedicated for authentication. This feature provides many advantages over storage devices or specialized hardware devices that are pre-manufactured and/or pre-configured for authentication.

Further, in certain embodiments, security data stored on a storage device for access management may not be transferred to another device, thereby ensuring that the storage device is secure as a hardware token based on the security data. The access data may be generated in a manner specific to the device for the user. Copying the security data to a different storage device may not enable that storage device to be used in the same manner for authentication by having a copy of the security data. The security data stored on a storage device may be secure, by way of encryption techniques and/or storage in the storage device in an inconspicuous manner that prevents improper access or tampering. The security data may be configured with respect to an application (e.g., a plug-in) on a device (e.g., a client device), such that the security data is only understood and accessible by the application. The application may be used to configure the security data. The application may be configured to communicate with an access management system, such as one implemented in or for an enterprise and/or cloud computing environment. The security data may be accessible by the access management system based on access information (e.g., an access key), provided by the application, thereby further ensuring secure communication of the security data.

In certain embodiments, an access management system determines, as part of MFA, authentication of the identity of a user at a device to enable the user to access resources at the device. The MFA may be determined based on verification of the identity of the user based on a storage device connected to the device. The storage device may have been registered by the user with the access management system based on an access privilege permitted to the user. Access privilege may be permitted for resources in cloud and/or enterprise computing environments. The storage device may be configurable for use in managing access by multiple users, each being registered with the access management system using the storage device to manage access.

Once registered, the devices and/or locations can be trusted by the access management system for access to users associated with those devices and/or locations. The access management system may enable password-less authentication of a user associated with any of a trusted device and/or location. Using devices registered with the access management system, a user can be provided with access to resource(s). A device registered with the access management system can be utilized for password-less authentication to authenticate the user at a trusted device and/or location. The possession of a registered device can serve as a point of trust to ensure that a user associated with the device is legitimate as a previously authenticated user.

In some embodiments, an access management system may include a computer system that is configured to implement methods and operations disclosed herein. A computer system may include one or more processors and one or more memory accessible to the one or more processors and storing one or more instructions that, upon execution by the one or more processors, causes the one or more processors to implement methods and/or operations disclosed herein. Yet other embodiments relate to systems and machine-readable tangible storage media, which employ or store instructions for methods and operations disclosed herein.

In at least one embodiment, a method may include determining that a user is not authenticated to access a resource requested at a device associated with the user. Access to the resource may be controlled by an access management system. The method may include identifying, at the device, a storage device that is connected to the device. The storage device may be identified to verify registration of the storage device as a security device for authentication of the user. The method may include determining that device information about the storage device is stored at a first location on the storage device. The device information may include an identifier of the storage device. The method may include generate, using a hashing process, an access key for verifying registration of the storage device. The access key may be generated based at least in part on the device information. The method may include generating key data based on a first decryption, using the access key, of security data stored at a second location on the storage device. The key data may include a private key and a public key. The method may include transmitting a message to request the access management system to verify registration of the storage device as the security device. The message may be encrypted using the private key. The message may include user information about the user and the device information. The method may include receiving, from an access management system, a response that is to responsive to the request to verify registration of the storage device. The response may include access data to enable access to the resource requested at the device. The access data may be generated based on verifying that the storage device is registered with the access management system for the user. The access data may be encrypted using a public key associated with registration of the storage device for the user at the access management system. The method may include generating decrypted access data based on a second decryption of the access data using the private key. The method may include enabling the device to access the resource using the decrypted access data.

In some embodiments, the first location is a file system located on the storage device and the second location is a key store located on the storage device.

In some embodiments, the device information includes one or more attributes about the storage device.

In some embodiments, the method may include identifying information about the storage device. The method may include generating, using a hashing process, an access key verifying that the device information is stored on the storage device. The access key may be generated based at least in part on the information about the storage device. The method may include obtaining, using the access key, the device information at the first location.

In some embodiments, the device includes a computer and the storage device is included in a computer system. The storage device may be connected to the device via a communication network. In some embodiments, the device is a mobile communication device, and the storage device is a computer-readable storage media that is physically connected to the device.

In some embodiments, verifying the storage device is registered with the access management system includes determining that the device information is stored in association with the user information.

In some embodiments, the method includes, based on determining that information stored at the first location does not identify the storage device, determining that the storage device is not registered with the access management system for the user. The method may include denying access to the resource at the device.

In at least one embodiment, a method may include identifying, at a device associated with a user, one or more storage devices that are connected to the device. The method may include generating a graphical interface that is displayed at the device. The graphical interface may display information about each of the one or more storage devices that are identified as connected to the device. The graphical interface may include an element that is interactive to select at least one of the one or more storage devices for registration as a security device. The method may include receiving an input for an interaction with the element. The input may correspond to a selection of a storage device from the one or more storage devices to register as the security device associated with a user. The method may include identifying device information about the storage device corresponding to the selection. The device information may include an identifier of the storage device. The method may include generating key data for the storage device. The key data may include a private key and a public key. The method may include generating, using a hashing process, an access key for configuring the storage device. The access key may be generated based at least in part on the device information. The method generating encrypted key data by encryption of the key data using the access key. The method may include storing the encrypted key data at a first location on the storage device. The method may include storing the device information at a second location on the storage device. The method may include transmitting, to an access management system, a request to register the storage device for the user, the request including the public key and device information. Based on the request, the public key and device information may be stored at the access management system in association with user information about the user for registration of the storage device. The method may include receiving a response indicating registration of the storage device as the security device for the user. The response may include access data to enable access to one or more resources requested at the device by the user.

In some embodiments, the storage device is included in a computer system, and the storage device is connected to the device via a communication network. In some embodiments, the storage device is a computer-readable storage media that is physically connected to the device. In some embodiments, the first location is a key store located on the storage device, and the second location is a file system located on the storage device. In some embodiments, the device information includes one or more attributes about the storage device.

The foregoing, together with other features and embodiments will become more apparent upon referring to the following specification, claims, and accompanying drawings.

BRIEF DESCRIPTION OF THE DRAWINGS

Illustrative embodiments of the present disclosure are described in detail below with reference to the following drawing figures.

DETAILED DESCRIPTION

In the following description, for the purposes of explanation, specific details are set forth in order to provide a thorough understanding of embodiments of the present disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

Figure 1:
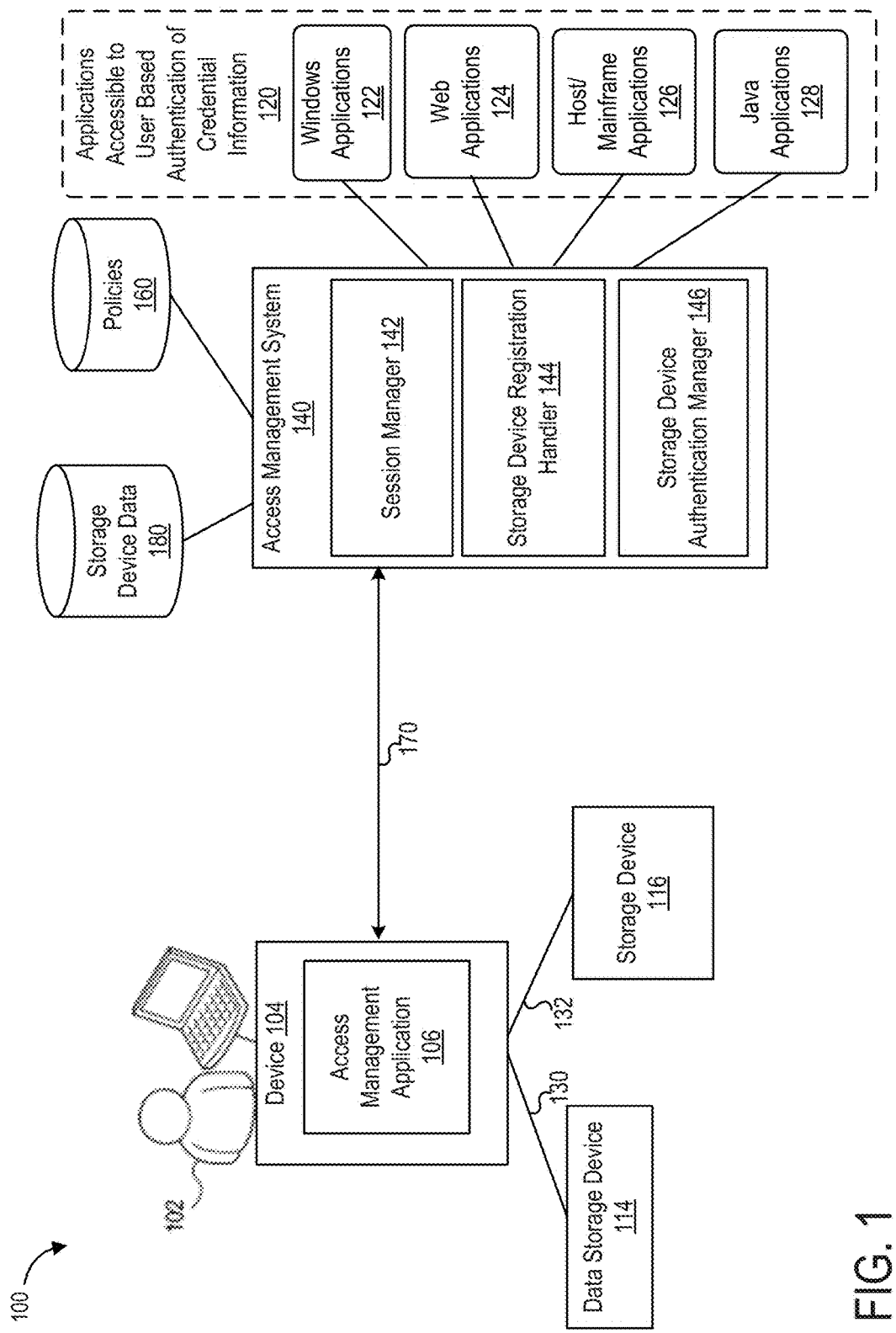
FIG. 1 illustrates a high-level diagram of a system for implementing a storage device as a security device for managing access to resources, in accordance with an embodiment.

I. High-Level Overview of an Access Management System for Implementing a Storage Device as a Security Device for Managing Access to Resources Some embodiments, such as systems, methods, and machine-readable media, are disclosed for managing access to resources using a storage device as a security device. FIG. 1 illustrates a system 100 in which a user (e.g., user 102) can operate a client, such as a device (e.g., computing device 104), to register a storage device as a security device that is "trusted" to enable password-less authentication with access management system 140. Device 104 may be a mobile device, such as a mobile communication device (e.g., a mobile phone). A disclosed herein, a "client" (also disclosed herein as a "client system" or a "client device") may be a device or an application (e.g., access management client 106) executing on a device. Storage devices can be portable such as data storage device 114, or may be remotely accessible, such as storage device 116.

Registration of a storage device as a "trusted" device for authentication of a user via an access management system (e.g., access management system 140) to perform authentication, without providing credential information (also referred to herein as "password-less authentication"), to obtain access to resources. A storage device configured as a security device can ensure that legitimate users have an easy way to authenticate and access the resources. A storage device can be configured with security data for authentication with an access management system. With the rise in use of mobile and portable devices for authentication, techniques disclosed herein enable use of a portable storage device to operate as a portable device as a point of trust for multi-factor authentication across any client application or device operated to access resources. After configuration, a portable storage device may be used for authentication of a user without credential information at any client device based on accessibility to the portable storage device. The portable storage device that is registered as a security device may be used to authenticate a user at any computer system, which has an access management client configured to communicate with an access management system.

In certain embodiments, techniques disclosed herein enable improve processing of a computer of an access management system. Such techniques can enable reduce usage of computing resources for authentication of a user based on a security device registered for the user. Once registered, a data storage device may be used for password-less authentication such that communication between a client device and an access management system may be reduced for the techniques disclosed herein whereby authentication of a user is performed by verifying the storage device for registration. A client device operated by a user may not need to solicit input from a user and/or engage in multiple communications with an access management system to verify credential information. The amount of communications between a client device and an access management system may be reduced because authentication can be determined based on data stored on the storage device. The disclosed techniques for authentication of a user based on a storage device may improve technology for authentication by enabling a storage device to be utilized as a trusted device for ensuring authentication of a user. Registration of a storage device as a security device enables a storage device to be configured or transformed into a trusted, security device, which when accessible to a user's client device, enables the client device to determine authentication without user input. Reducing the need for a user to provide input for authentication further reduces if not eliminates credential information or sensitive information from being compromised.

For purposes of illustration, a "storage device" as disclosed herein a device that is capable of storing electronic data (e.g., a data storage device); however, a storage device may include other types of storage devices capable of being configured as a security device for authentication as disclosed herein. Data as disclosed herein is referred to as electronic data. Data may include any type of data including metadata. A storage device can be accessible by a device used as a client for configuration the storage device as a security device when the storage device is communicatively connected to the device. A storage device may be accessible for configuration as a security device when the storage device permits the device to read and write data on the storage device. Preferably, a storage device can be a portable device that is accessible by a device, e.g., device 104. Such a storage device can be transferred to different client devices such that the storage device can be used at those storage devices for authentication of a user based on the client device, which has accessibility to the storage device.

A storage device can be any type of persistent storage device capable of storing electronic data. Storage devices may include a non-transitory memory device, including volatile and non-volatile memory devices. Examples of memory devices may include system memory, such as a number of memories including a volatile main random access memory (RAM) for storage of instructions and data during program execution and a non-volatile read only memory (ROM) or flash memory in which fixed instructions are stored. System memory may include multiple different types of memory, such as static random access memory (SRAM) or dynamic random access memory (DRAM). Storage devices may include non-transitory computer-readable storage media. For example, computer-readable storage media may include volatile or non-volatile, removable or non-removable media implemented in any method or technology for storage of information such as computer-readable instructions, data structures, program modules, or other electronic data. By way of example, computer-readable storage media may include non-volatile memory such as a hard disk drive, a magnetic disk drive, an optical disk drive such as a CD ROM, DVD, a Blu-Ray® disk, or other optical media. Computer-readable storage media may include, but is not limited to, Zip® drives, flash memory cards, universal serial bus (USB) flash drives, secure digital (SD) cards, DVD disks, digital video tape, and the like. In FIG. 1, data storage device 114 can be a flash memory drive that is portable for use and accessibility at different computer systems. Computer-readable storage media may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media may provide storage of computer-readable instructions, data structures, program modules, and other data for computer system 1400. In some embodiments, a storage device can be implemented as one or more flexible pools of logical storage that are virtualized to maintain virtual storage devices on a computer system (e.g., a server). Storage devices may be implemented as network-attached or network-accessible storage devices. Such storage devices may be accessible via a storage-area network (SAN).

A client may include a computing device or an application executing on a computing device. In FIG. 1, computing device 104 (e.g., a computer system) may include application 106 executing on computing device 104. Application 106 may be downloaded from a source, such as an online application store. Application 106 may include or implement a web browser that provides an access management portal that communicates with access management system 140 to control access to resources. For example, application 106 may be "an access management application (also referred to herein as "access management client") provided by an access management system and configured to securely communicate with the access management system for authentication and configuration of a storage device as a security device. Application 106 may can mange authentication for access management system 140. An example of an application may be a mobile authenticator application provided by Oracle, Corporation. As will be described below, application 106 may be used to registered a client with access management system 140. Application 106 may communicate with or utilize functionality available on device 104 to determine storage devices that are accessible to device 104 and to communicate with those storage devices for registration and/or verification of registration for authentication of a user.

System 100 can provide single sign-on (SSO) access. A SSO session may provide a user with access to one or more systems after an initial authentication based on authentication of credential information (e.g., a username and a password). Access to a system may provide access to one or more resources. Resources may include any item managed and/or stored by a computing system, such as an application, a document, a file, electronic content, and/or the like. A resource may be identified by a uniform resource locator (URL) or other data indicating a source of the resource.

For purposes of illustration, "session" as described herein includes an SSO session; however, a session may include other types of sessions enabling access to a user. Access management system 140 may provide access one or more resources based on establishing a session after authentication of a user. Access management system 140 may implement a sign-on system, e.g., a SSO system, which can establish an SSO session to provide SSO access to one or more resources.

Resources may include, without restriction, a file, a web page, a document, web content, a computing resource, or an application. For example, system 100 may include resources such as applications 120 and/or content accessible through those applications 120. A resource may be requested and accessed using an application. For example, an application may request access to a web page from a resource server based on a URL identifying a requested resource. Resources may be provided by one or more computing systems, e.g., a resource server that provides access to one or more resources upon authentication of user 102 in a SSO system.

Access management system 140 may be implemented by a computing system. The computing system may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Access management system 140 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Access management system 140 may be implemented using hardware, firmware, software, or combinations thereof.

In some embodiments, access management system 140 may be implemented by multiple computing devices (e.g., access manager servers) deployed as a cluster in a data center, which allows for scalability and high availability. Multiple such geographically dispersed data centers with access manager server clusters can be connected (wired or wirelessly) to constitute a multi-data center (MDC) system.

An MDC system may satisfy high availability, load distribution, and disaster recovery requirements of access servers within an enterprise computer network. An MDC system may act as a single logical access server to support SSO services for access management system 140.

Access management system 140 may include at least one memory, one or more processing units (or processor(s)), and storage. The processing unit(s) may be implemented as appropriate in hardware, computer-executable instructions, firmware, or combinations thereof. In some embodiments, access management system 140 may include several subsystems and/or modules. For example, access management system 140 may include session manager 142, storage device registration handler 144, and storage device authentication manager 146. Each of these subsystems and/or modules in access management system 140 may be implemented in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Computing device 104 may communicate with access management system 140 via one or more communication networks. Access management system 140 may communicate with computing device 104 via one or more communication networks 170. Examples of communication networks may include a mobile network, a wireless network, a cellular network, a local area network (LAN), a wide area network (WAN), other wireless communication networks, or combinations thereof.

FIG. 1 shows an example in which user 102 can operate device 104 to engage in communication with access management system 140 to register storage device 114 as a security device for authentication of user 102. In this example, user 102 operating computing device 104 may attempt to access a resource such as an application, e.g., any one of applications 120 or the resources accessible through applications 120. Applications 120 may be accessible to user 102 upon successful authentication of credential information for user 102. User 102 may provide credential information for initial authentication. Access management system 140 may instruct access management client 106 to perform multifactor authentication (MFA). User 102 may operate computing device 104 to register storage device 114 and/or storage device 116 as a security device if neither storage device is registered. In this example, storage device 114 may be a local storage device that is physically connected to device 104. Storage device 116 may be a storage device that is not physically connected to device 104, but is accessible to device 104. A storage device may be registered as a security device so long as the storage device can be accessed for read and write capabilities, including storage of data on the storage device for registration of the storage device. Based on successful MFA of user 102 including authentication based on verification of registration of the storage device 114, a user may be permitted to access an application.

Access management application 106 manages access to a user's account via access management system 140. For example, application 106 is an access management application that may present interfaces, such as graphical user interfaces (GUIs), some of which are disclosed herein. The application may be provided as part of a service (e.g., a cloud service) or a network-based application. Applications may enable a user to access and perform services provided by access management system 140. Access management system 140 may be configured to run one or more services or software applications described in the foregoing disclosure. For example, access management system 140 may provide many SSO services including management of access (e.g., granting/denying access) to resources, automatic sign-on, application password change and reset, session management, application credential provisioning, as well as authentication of a session. In some embodiments, access management system 140 can provide automatic single sign-on functionality for applications 120, such as Windows® applications, Web application, Java® applications, and mainframe/terminal-based applications running or being accessed from client devices. As explained above, access management system 140 may perform authentication of a user (e.g., user 102) operating a client device (e.g., computing device 114). Authentication is a process by which a user verified to determine that he/she is who he/she claims to be.

Access management system 140 may also provide services or software applications can include non-virtual and virtual environments. In some embodiments, these services may be offered as web-based or cloud services or under Software as a Service (SaaS) model to the users of clients. The services offered by access management system 140 may include application services. Application services may be provided by access management system 140 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in access management system 140, which may be implemented as a cloud infrastructure system. Users can acquire the application services without the need for customers to purchase separate licenses and support. Various different SaaS services may be provided. Users operating clients may in turn utilize one or more applications to interact with access management system 140 to utilize the services provided by subsystems and/or modules of access management system 140.

In some embodiments, access management system 140 may use one or more policies stored in a data store 160 ("policies") to control access to resources. Policies 160 may include an authentication policy that specifies the authentication methodology to be used for authenticating the user for whom the access must be provided on a given resource. The authentication methodology or process may be resource dependent. The authentication methodology or process may include MFA. Policies 160 define the way in which the resource access is to be protected (e.g., type of encryption, or the like). Policies 160 may include an authorization policy that specifies the conditions under which a user or group of users has access to a resource upon authentication of the user(s). For example, an administrator may only authorize certain users within a group to access particular resources. Access management system 140 may determine authentication for an SSO session based on one or more of policies 160.

Access management system 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, access management system 140 is coupled to or includes one or more data stores for storing data such as policies 160 and storage device data 180 ("storage device data"). The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Session manager 142 may handle processing to determine whether a valid session exists for user 102 to access a resource. Session manager 142 can checks for a valid session for user 102 to access a requested resource that is protected. Session manager 142 may assess validity of a session for user 102 based on consideration of one or more access policies applicable to user 102. Based on determining that a valid session does not exist for user 102, session manager 142 may determine an authentication process for determining authentication of user 102 to access a resource. Session manager 142 may implement MFA to determine authentication of a user. Multi-factor authentication may involve use of multiple, different authentication techniques. In one example, the authentication process may include verifying credential information ("credentials") from user 102. The authentication process may include verifying registration of a storage device accessible to device 104, such that the storage device is registered for user 102. Successful authentication of user 102 may be determined based on successful completion of the authentication process. Upon successful authentication, a user may be provided with access to one or more resources, which may include a requested resource.

Storage device registration handler 144 may is configured to handle processing and communication with access management client 106 for registration of a storage device as a security device. Data about registration of a storage device may be stored in data store 160. Device information about a storage device may be stored in association with user information for registration of the storage device for a user. Storage device registration handler 144 may store security data, such as an access key, with registration of a storage device. The security data may be used by access management system 140 to securely communicate with access management client 106, which encrypts communications with a corresponding access key (e.g., a private key).

Storage device registration handler 144 may be equipped with cryptography capabilities to encrypt and decrypt communications with access management client 106. Security data may be stored in storage device data 180. Encryption and decryption performed as disclosed herein may use one or more known techniques for encryption.

Storage device authentication manager 146 may be configured to determine authentication of a user based on registration of a storage device. Storage device authentication manager 146 may be configured for communication with storage device registration handler 144. Storage device authentication manager 146 may perform processing to verify whether a storage device is registered based on information provided by access management client 106. Storage device authentication manager 146 may be equipped with cryptography capabilities to encrypt and decrypt communications with access management client 106. Security data may be stored in storage device data 180. Encryption and decryption performed as disclosed herein may use one or more known techniques for encryption. Storage device authentication manager 146 may decrypt communication from access management client 106 and determine whether device information matches that which is registered for a storage device for authentication of a user.

Upon determining authentication of a user, session manager 142 can provide access to a user based on authorization of the user after authentication. Session manager 142 may provide access data (e.g., an access token or a URL with access to a resource) to access management client 106 to permit a user to access a resource. The access data may be encrypted using a technique for encryption such as a corresponding access key (e.g., a public key) that matches an access key generated by access management client 106 for a key pair.

User 102 may operate computing device 104 to use access management client 106 to access a portal (e.g., a web page) provided by access management system 140 to register storage devices, as trusted authentication devices. Computing device 104 may request, though the portal, access management system 140 to access features for registration of a storage device. A request may be communicated to computing device 104, which in response, prompts user 102 for user credentials to determine authentication of a session. The request may include information (e.g., a URL) to a web page or a user interface (e.g., a web page, portal, or dashboard) to receive credential information. Session manager 142 may perform operations to authenticate credential information for user 102. Session manager 142 may provide interfaces, such as those disclosed with reference to FIGS. 4-9 for authentication of a user based on accessibility of a storage device registered as a security device. Upon registration of a storage device to be trusted for use as a mobile authenticator for password-less authentication, the storage device may be used to perform password-less authentication for subsequent attempts to access resources at a client.

In some embodiments, session manager 142 may store information about sessions established upon successful authentication of a user. For a SSO session (e.g., SSO authenticated sessions), the SSO session may be managed as a SSO session enabling access to all resources accessible to user based upon successful authentication of credential information for a user. Session manager 142 can determine resources that are protected and based on authentication sessions, can determine resources that are permitted and/or restricted for a session based on authorization permitted to a user upon authentication.

Communications between a client and access management system 140 can be received through a gateway system. The gateway system may support access management services. The gateway system may support access management services. For example, a single sign-on (SSO) gateway may implement one or more access agents, such as agent (e.g., web gate agent), to balance and/or handle requests from clients and access management system 140. In some embodiments, access management system 140 may be implemented in system 100 according to an agent-server model for communication between device 104 and any one of access manager servers implemented for access management system 140. The agent-server model may include an agent component (e.g., a gateway system) and a server component. The agent component may be deployed on a host system and the server component may be deployed on a server, e.g., an access manager server. Computing device 104 may be a workstation, personal computer (PC), laptop computer, smart phone, wearable computer, or other networked electronic device.

Access management system 140 may present user 102 with a request for authentication according to MFA authentication techniques (e.g., via the user's web browser at computing device 114). In some embodiments, user 102 can access an SSO user interface through access management client 106 executing on computing device 104 or through a web browser on computing device 114. The SSO user interface may be implemented at access management system 140. Access management system 140 may send the SSO user interface or information (e.g., a URL) enabling access to the SSO user interface.

In some embodiments, an SSO user interface can include a list of the applications user 102 commonly utilizes. User 102 can manage their credentials and policies associated with applications through the SSO user interface. When user 102 requests to access an application, e.g., application 140, through the SSO user interface, a request may be sent from computing device 114 to access management system 140 to determine a policy type for the application from one or more policies 160 applicable to user 102. Access management system 140 may determine whether a valid session exists for the user and if so, then it can determine user's 102 authentication.

In some embodiments, a request for access to a resource after authentication may include access data (e.g., an authentication cookie) from the authentication that can be used to determine whether user 102 is authenticated. If authenticated, the user can be logged into the application using the access data. In some embodiments, an agent can enable users to access applications 120 using SSO services provided by access management system. Access may be provided through a web browser directly, without first accessing the SSO user interface or using a client executing on computing device 114. If user 102 is not authorized, then access management system may request credentials from user 102. The SSO user interface may present an interface to receive input including credential information. The credential information may be sent to access management system 140 to determine authentication of user 102.

In some embodiments, credential types can be supported, such as Oracle Access Management protected resources, federated applications/resources, and form-fill applications. Examples of credential types may include a Smartcard/Proximity card, a token, a public key infrastructure (PKI), a Windows Logon, a lightweight directory access protocol (LDAP) logon, a biometric input, or the like. For OAM protected resources, user requests can be authenticated and then directed to URLs associated with the requested resources. For Federated Applications, links to federated partners and resources can be provided, including business to business (B2B) partner applications and SaaS applications. For form fill applications, templates can be used to identify fields of application web pages through which credentials can be submitted.

The some embodiments, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in sequence diagrams and flowcharts herein can be implemented by device 104, access management client 106, a computing system of an access management system, e.g., access management system 140 of FIG. 1, or a combination thereof. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In an aspect of some embodiments, each process in this figures of this disclosure can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

II. Registration of a Storage Device as a Security Device for Managing Access to Resources Now turning to FIG. 2, examples are shown of a sequence of operations 200 for MFA which may be used to enable authentication of a user at a device based on a storage device accessible to the device. The operations 200 illustrate a process for registering a storage device as a security device for managing access to resources, in accordance with an embodiment. Operations 200 described with reference to elements of FIG. 1. The operations described with reference to access management system 140 may be implemented by one or more modules or blocks in access management system 140. In some embodiments, device 104 may include an application (e.g., a client or a browser) that performs some or all of the operations disclosed herein as being performed by device 104. In such embodiments, access management client 106 may be an application or a plug-in that runs with, or embedded in an application on device 104.

Starting at step 202, a user (e.g., user 102) may operate a client (e.g., device 104) to obtain access one or more resources in a computing environment, such as a cloud or an enterprise computing environment. As disclosed herein, a resource may be accessed in a client, such as an application, or a browser. For example, a user may operate device 104 to access a portal of resources (e.g., an access management portal of a website shown in FIG. 7) in an enterprise system or cloud system. The port may provide one or more graphical interfaces access one or more resources, such as a human resources, expenses, and other data. Based on input by a user at device 104 to access a resource (e.g., input into a client or browser), a request to access a resource may be generated at device 104. The request may be sent to an access management system 140. A request for access to a resource may be generated at device 104 by device 104 or an application providing access to the resource.

Access management client 106 may facilitate communication between device 104 and access management system 140. Some or all of the communication between device 104 and access management system 140 may be supported through access management client 106. Access management client 106 may be configured to securely communicate with access management system 140 by having knowledge of communication and encryption techniques supported by access management system 140. Access management client 106 may be initiated before a resource is requested. Access management client 106 may be initiated based on a request to access a resource at device 104. In some embodiments, an application providing access to the requested resource, may communicate with access management client 106 to determine access permitted for a user. The request 202 may be generated by access management client 106 to determine access to a resource. A request sent to access management system 140 may include information about the user requesting access, information about device 104, or a combination thereof.

At step 204, access to a resource requested from device 104 may be determined for the user requesting the access. Determining access may include determining an authentication process for determining the access to a resource. Access may be permitted based on successful authentication of the user according to the authentication process. The authentication process may be determined based on the resource requested for access. Access to a resource may be permitted based on a privileged to the user according to a role of the user. The authentication may be determined to include MFA, which includes verifying access credential information for the user.

Figure 4:
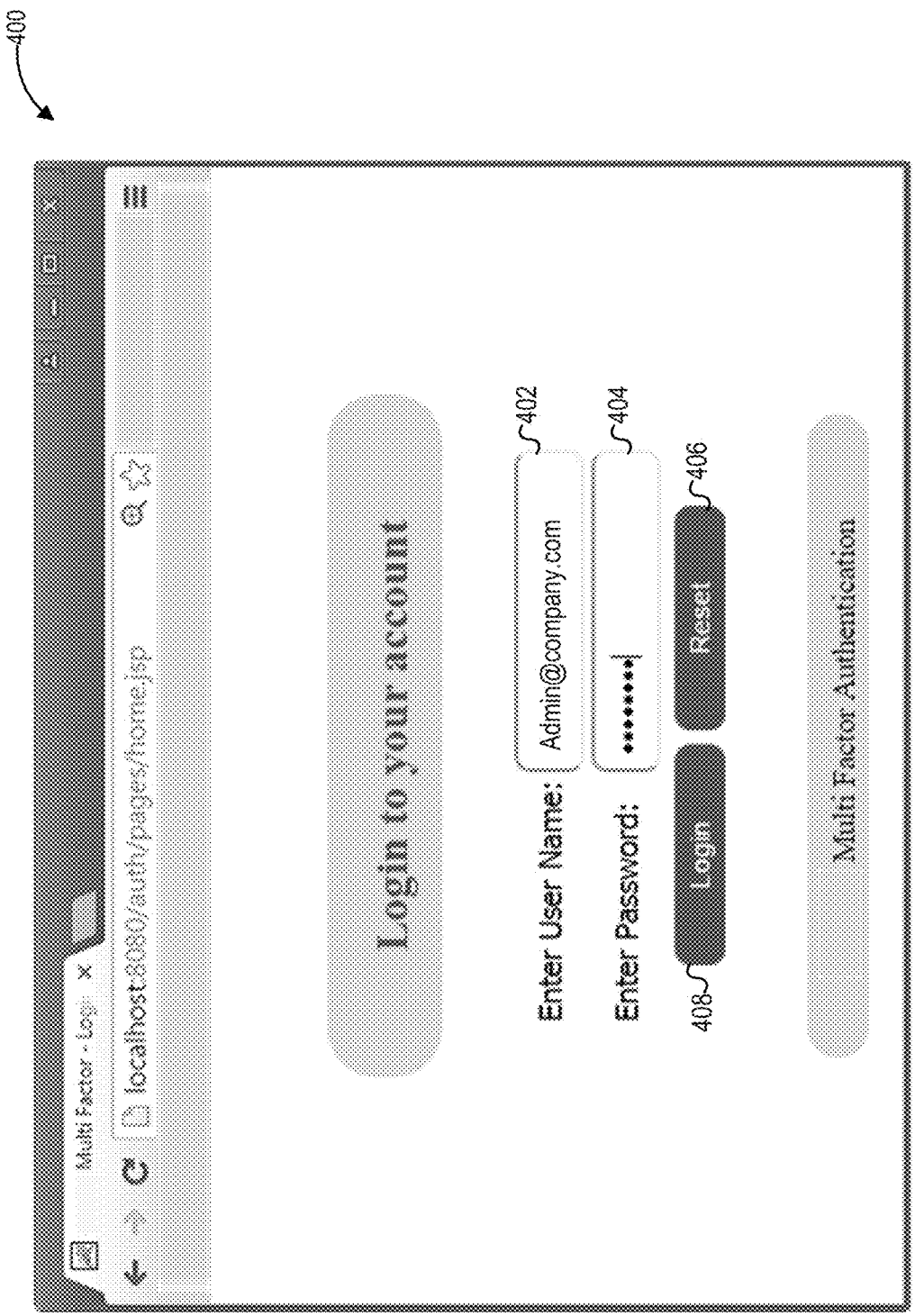
FIGS. 4-9 illustrate interfaces for implementing a storage device as a security device for managing access to resources, in accordance with an embodiment.

At step 206, access management system 140 may implement an authentication process to determine access to a resource. The authentication process may include obtaining and verifying credential information from the user at device 104. Access management system 140 may request credential information from the user by sending a request to device 104. Credential information may be obtained using a variety of techniques known in the art. For example, access management system 140 may send a link to a web page to receive credential information. The web page may be hosted by access management system 140 to ensure that credential information (e.g., identification, password, or personal access code) is obtained in a secure manner without intervention. A request may be sent to device 104 to request credential information. The request may be provided to the user at device 104 with the help of access management client 106. For example, access management client 106 may present the web page (e.g., a login web page) to the user at device 104. FIG. 4 illustrates an example of a graphical interface of a web page presented at device 104 to collect credentials. In some embodiments, a client or a browser on device 104 may display the web page.

At step 208, a user operating device 104 may provide input to the web page using device 104. The input may include credential information requested for authentication. At step 210, device 104 may send, to access management system 140, a request including credential information received at step 206. At step 212, access management system 140 may receive the credential information sent at step 210. Access management system 140 may determine authentication of the user for the authentication process based on the credential information received. The authentication process may have been determined at step 204.

In some embodiments, an authentication process may be determined based on a resource requested to be accessed. The authentication process may be determined based on a role of a user. The role of the user may be determined based on information in or associated with an account of the user to be verified for authentication based on the credential information. The authentication process may include MFA including authentication based on a data storage device (e.g., storage device 114) disclosed herein. The options for MFA may depend on the resource requested for access. In some embodiments, a user may be presented with authentication options to choose a type of authentication mechanism as part of the authentication process.

Authentication of the user based on the credential information may be determined by comparing the credential information to credential information previously created by the user and stored for an account of the user. Successful authentication may be determined based on determining that the credential information matches the credential information previously created by the user for an account of the user.

At step 214, based on successful authentication of the user at step 212, access management system 140 may determine further authentication (e.g., MFA) of the user based on the authentication process determined for the user. The authentication may be based on techniques disclosed herein for determining authentication of a user based on a data storage device accessible to device 104.

Figure 8:
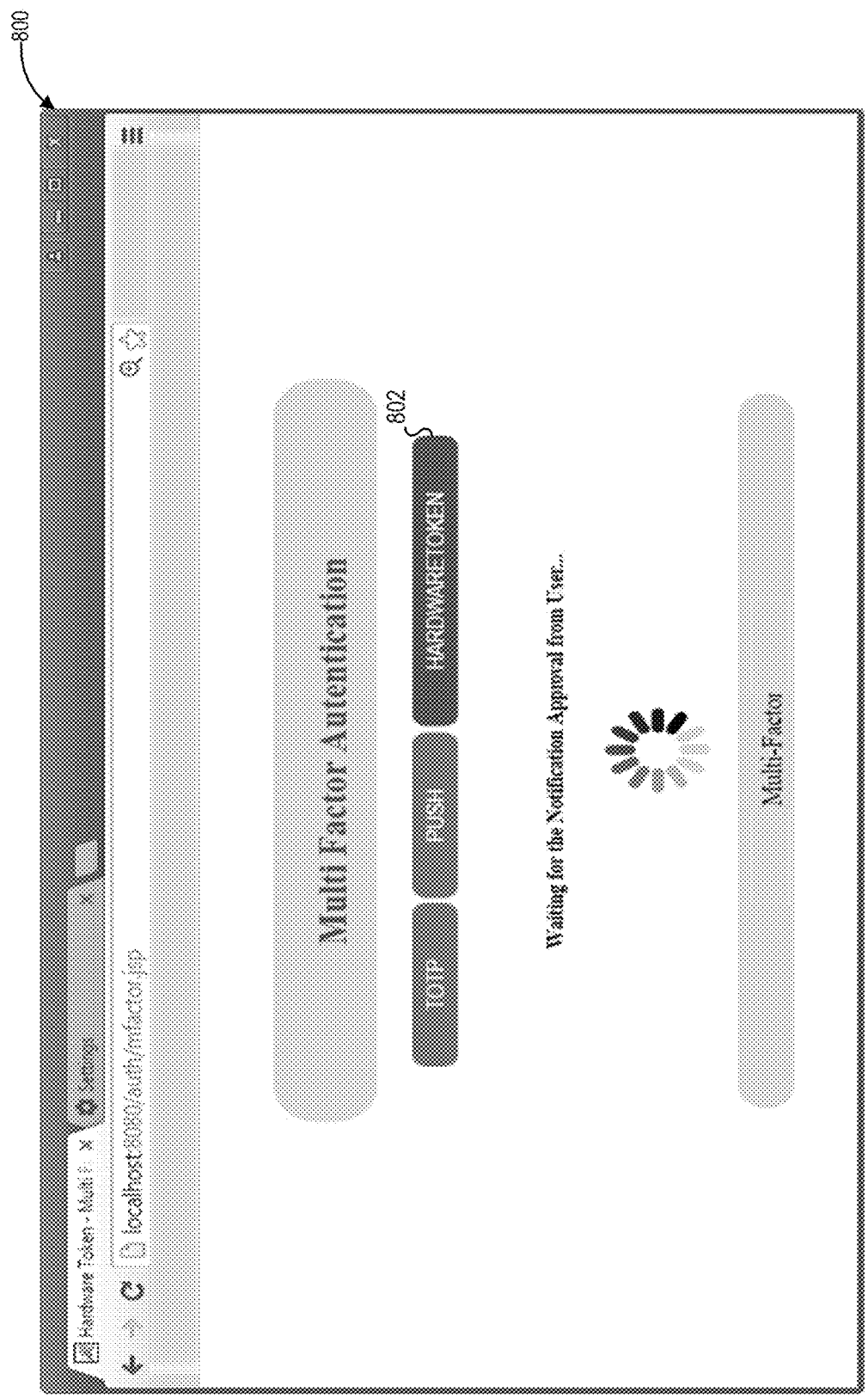

Step 214 may include access management system 140 sending, to device 104, a request to determine a second authentication process as part of MFA for the authentication process to access a requested resource. The first authentication may be verification of credential information. The request may include information about options of different authentication processes the user can select for the second authentication. The options may be presented to the user at device 104 in a client, such as an application, or browser. In at least one embodiment, access management system 140 may send, to device 104, a link to access a web page (e.g., a web page with options to initiate an authentication process for MFA) at device 104. The web page may be hosted by access management system 140 to ensure that any of the authentication processes are performed securely, and in accessible from non-authorized parties. FIG. 8 illustrates an example of a graphical interface of a web page presented at device 104 to present options for authentication processes, one of which includes an authentication process using a storage device as a security device (e.g., a hardware token) for authentication.

In at least one embodiment, access management system 140 may determine that MFA for the authentication process includes authentication using a security device (e.g., a storage device) registered for the user as one factor of authentication. Access management system 140 may determine, from an account of the user, that a storage device has not been registered as a security device for authentication. Access management system 140 may send a message to device 104 requesting the registration of a security device for MFA. The message may be presented by access management client 106. In some embodiments, the message may cause access management client 106 to execute.

At step 216, device 104 may receive the message sent at step 214. A client or other application on device 104 may initiate an authentication process for MFA. For example, device 104 may utilize access management client 106 to initiate a process for MFA. MFA may include authentication using a data storage device as a security device. At step 216, device 104 may determine whether any storage devices, e.g., storage device 114 exist, and if so whether registered. Device 104 may check whether any storage devices are accessible to device 104. Device 104 may request access management client 106 to determine whether any storage devices are registered. Device 104 may initiate a registration process to register a storage device. The process of registering a data storage device may include authentication of a user. The user may be authenticated for MFA based on successful registration of the data storage device as a security device for MFA.

In some embodiments, access management client 106 may perform an authentication for MFA based on the message received from access management system 140 at step 218. Access management client 106 may be configured to communicate with access management system for an authentication processing, which includes registering a data storage device as a security device for authentication At step 218, a process for registration of a storage device (e.g., storage device 114) may be initiated at device 104. Device 104 may implement an application (e.g., a client) that uses access management client 106. Device 104 may operate based on interaction with an interface of the application. The interaction may provide input to request a process for registration of storage devices.

A client or application on device 104 may execute or request access management client 106 to start a process for registration of a storage device 114. Access management client 106 may be requested by device 104 to determine authentication for a user based on the authentication process requested by access management system at step 214. Access management client 106 may display a graphical interface (e.g., graphical interface in FIG. 6) to enable a user to register a storage device as a security device for authentication of a user. The graphical interface may display whether any data storage devices are accessible at device 104 to register any of the data storage devices as a security device for authentication. The graphical interface may include one or more elements that are interactive to receive input to select any of the data storage devices accessible at device 104.

At step 218, access management client 106 may be requested to determine whether any data storage devices are accessible to device 104. Device 104 may request access management client 106 to determine devices that are accessible to device before, during, or after loading access management client 106 for display. An interaction with a client or application on device 104 may initiate the request to access management client 106 to operate for registration of storage device. In some embodiments, a user may interact with the graphical interface to view the data storage devices that are accessible to device 104. The interaction may cause access management client 106 to determine which, if any, data storage devices are accessible to device 104.

At step 220, operations are performed to determine whether any storage devices are accessible from device 104. Access management client 106 may initiate processing to identify the storage devices, if any, are accessible to device 104. A storage device may be registered as a security device if the storage device can be accessed to store security data for registration. Access management client 106 may utilize an interface (e.g., a programming interface) on device 104 and/or functions of device 104 (e.g., one or more functions to access a physical interface on a device) to determine if any storage devices are accessible to device 104. For example, access management client 106 may determine whether any storage devices are accessible (e.g., connected) to device 104 via one or more hardware components (e.g., a port) of device 104. In some instances, a storage device may be a network-based storage device, which is accessible through a communication connection between device 104 and the network-based storage device. Access management client 106 may detect that storage device 114 is accessible to device 104 because it is connected to device 104. Device information may be obtained for each storage device that is accessible to device 104.

At step 222, access management client 106 may provide a graphical interface (e.g., graphical interface in FIG. 6) that displays device information about each storage device determined at step 220. The graphical interface may be provided to or made accessible by device 104. The identified devices may be displayed as a list. Interaction with the graphical interface may cause a graphical interface to be displayed with device information for a device selected in the list of devices. At step 222, in some embodiments, access management client 106 may send device information about the identified storage devices to device 104. At step 224, a client or application on device 104 may display a graphical interface with the device information for each storage device that is identified.

At step 224, device 104 may receive input through a graphical interface displaying device information of storage devices accessible to device 104. The input may correspond to an interaction with a storage device selected for registration as a security device. The input may be processed to determine the storage device selected based on the input.

At step 226, access management client 106 is requested to create security data for registering the storage device selected at step 224. Based on the input indicating a selected storage device at step 224, device 104 may send a request to create security data for that storage device. Access management client 106 may provide an interface (e.g., a programming interface) for registering a storage device as a security device. For example, the request to create security data may be requested through an interface provided by access management client 106. The request may be to create a hardware token (e.g., createHardwareToken( )), including a parameter with device information.

At step 228, access management client may perform a process for configuring the selected storage device as a security device. Configuring the storage device may include creating a footprint on the storage device (e.g., createFootPrint( )) for the user. Configuring the storage device may include generating security data for a domain of the user. The domain may be the scope of a user's access with the computing environment in which resources are accessible to the user. The security data may be stored on the storage device as part of configuring the storage device by creating a footprint for the user.

Security data may include security key data. Security key data (e.g., one or more security keys) may be generated for each storage device that is registered. For example, a key pair may be generated for the user with respect to a storage device being registered. The key pair may be generated using a variety of known cryptography techniques. In at least one embodiment, a key pair may be generated using a programming interface for RSA. The key pair may include a private key and a public key. The private key can be securely stored on the storage device, accessible to access management client 106 that created the key. Access to the private key may be limited to access management client 106 to ensure security of security data stored on a registered storage device. The public key can be shared with access management system 140 for secure communication of information to authenticate a user based on a security device. Access management system 140 can use the public key to securely access information communicated by access management client 106 and securely share information to access management client 106.

The security key data may be stored on the storage device for which the information was created for registration of the storage device as a security device. For example, the security key data (e.g., a key pair) may be stored in a key store of the storage device. The security key data may be stored in a protected and/or secure format to prevent tampering by unauthorized access of the storage device. For example, the security key data may be stored using one or more techniques for encryption. In at least one embodiment, unique data, such as unique access information, such as a key (e.g., security token or passkey) may be generated. The passkey may that be generated in a manner that is only known by access management client 106; such that access management client 106 can decipher the passkey to access the security key data. For example, the passkey may be generated as a unique hash value. The hash value may be based on or using information (e.g., device information, serial number, volume information, etc.) about or related to the storage device to be registered for a user. The passkey may not be transferred to another storage device such that the access management client 106 may permit that storage device to be used as the storage device previously registered as a security device for authentication.

In some embodiments, the passkey may be generated based on unique information about the storage device on which the passkey is being stored. The information about the storage device may be included in the device information specified in step 226. The information about the storage device may include a device identifier (e.g., a device serial number), device attributes (e.g., volume information), or other information about the storage device. The passkey may be generated in part based on information unique to a user for whom the storage device is being registered.

Security data may include device data about the storage device being registered and/or information about a user that is registering the storage device for authentication. The device data may include data about the device, such as a device identifier (e.g., a device serial number) or device attributes (e.g., volume information). Storage device being registered may be modified to store the device data to create a footprint as a security device. In some embodiments, the security data stored on the storage device may include server data including information identifying access management system 140, such as a server with which access management client 106 is to communicate with. The device data and the server data may be stored as security data in a file system of the storage device. For example, the device data and the server data may be stored as or in a wallet file directory on the storage device. The security data stored in a file system may be encrypted based on unique information about the storage device on which the security data is being stored. The information about the storage device may be included in the device information specified in step 226. The information about the storage device may include a device identifier (e.g., a device serial number), device attributes (e.g., volume information), or other information about the storage device.

After creating and storing the security data on a storage device to be registered, at step 230, access management client 106 may communicate with access management system 140 as part of registering the storage device. Access management client 106 may enroll or register the storage device with access management system 140. Registering the storage device may include access management client 106 sending a request to access management for enrollment of the storage device. The request may include device information identifying the storage device to be registered. The request may include all or portion of the security key data (e.g., a public key of the key pair). The request may include the passkey, or security token, uniquely generated based on the device information about the storage device. In some embodiments, the request may include user information (e.g., user identification) of a user registering the storage device. In some embodiments, the request may include the resource initially requested for access at step 202.

At step 232, based on a communication from access management client 106, access management system 140 may register the storage device identified in the communication (e.g., a request at step 230). Registration may include creating registration data for the user with respect to the storage device identified in the communication (e.g., a request at step 230). Access management system 140 may remember the resource requested for access at step 202. Access management system 140 may generate a request identifier for the request to register the storage device. The request identifier may be associated with the resource requested for access. The device information may be stored in association with user information (e.g., user identification) and security data (e.g., a public key and a passkey) received in the request sent at step 230. The enrollment, or registration of a storage device may be complete after storing the device information.

In some embodiments, at step 234, access management system 140 may send a communication as part of registration of a storage device. To provide for further authentication of a storage device for registration as a security device, access management system 140 may send access data to device 104 at step 234. The access data may be sent for a verification process. At step 234, access management system 140 may generate access data including device information about the storage device being registered. The access data may include request information for the enrollment request to register the storage device. The access data may be generated as a string of unique data for enrollment of the storage device. For example, the access data may be generated as a uniform resource locator (URL) string. The URL may provide access to the requested resource. In some embodiments, the URL may be a redirect URL, which provides redirection to a requested resource. The access data may be sent to device 104. In some embodiments, the access data may be sent to device 104 through access management client 106 at step 234. The access data may be sent from access management system 140 to access management client 106 to indicate completion of enrollment of the storage device, at step 234. Access management client 106 may store information indicating that registration of the storage device is complete. The information stored may be based on the access data. The information may be stored in the file system (e.g., wallet file) with the server data.

At step 234, the access management client 106 may send or provide a message to a client or an application on device 104 indicating that registration of the storage device is complete. The message may include the access data received from access management system 140. The message may indicate that the user is authenticated to access the resource. In some embodiments, access management client 106 may provide a graphical interface to display information based on the access data, such as information indicating a status of registration of a storage device. For example, the graphical interface displayed with reference to FIG. 5 may be displayed by access management client 106. The graphical interface may be presented with the redirect URL providing access to the resource based on registration of storage device 114.

At step 236, information based on the access data may be displayed in a graphical interface, such as a client or an application on device. For example, the graphical interface displayed with reference to FIG. 5 may be displayed with the redirect URL providing access to the resource based on registration of storage device 114. Based on received access data, access to the resource requested by the user is permitted At step 238, the access data may be used to obtain access to the requested resource. A client or application on device 104 may request access to a resource by sending all or a portion of the access data to access management system 140. For example, a request may be sent from device 104 to access the resource based on the URL provided in the access data. The request may be sent as a request to render a resource based on redirection provided by the URL.

In some embodiments, input may be received for an interaction with the graphical interface. The interaction may correspond to selecting the URL presented in the graphical interface. Based on the input, device 104 may request the access management system 140 to provide access to the resource using the redirect URL.

In some embodiments, the access data presented in the graphical interface by device 104 may be used to complete registration of a storage device before access to a resource is provided. The URL presented in the graphical interface, such as the example shown in FIG. 5 may be copied and entered into a graphical interface of access management client 106 to complete the registration of a storage device. Access management client 106 may verify the URL by sending the URL to access management system to determine whether the URL is the same as that which was provided by the access management system 140 to device 104. Access management client 106 may process the URL to determine whether the device identifier matches a device identifier of the storage device which is being registered. Upon verification of the URL, access management client 106 may generate a graphical interface to display a notification indicating whether the storage device was successfully registered or not. Access management client 106 may facilitate providing access to the resource by sending a request with the URL to access management system 140.

At step 240, access management system 140 may determine access to a resource based on a request received with access data (e.g., a redirect URL) for the requested resource. Access management system 140 may verify the device identifier and request identifier with data stored in association with a user for a registered storage device. Based on verifying that each of the device identifier and the request identifier match the data stored for registration of the storage device, access management system 140 may provide access to the requested resource (e.g., a URL or a web page).

At step 242, access management system 140 may send a web page or a URL to access a resource that is permitted for access. A client or application on device 104 may display the access to the resource. For example, a graphical interface shown with reference to FIG. 7 may be displayed with the requested resource (e.g., a profile page of a human resources system).

III. Accessing a Resource Using a Storage Device as a Security Device for Authentication Now turning to FIG. 3, examples are shown of a sequence of operations 300 for MFA which may be used to enable authentication of a user at a device based on a storage device accessible to the device. The sequence of operations shown in FIG. 3 may be performed after a storage device (e.g., a storage device 114) has been registered for authentication of a user at a device (e.g., device 104). The operations 300 illustrate a process for using a storage device as a security device to determine authentication of a user to access a resource, in accordance with an embodiment. Operations 300 described with reference to elements of FIG. 1 and FIG. 2. The operations described with reference to access management system 140 may be implemented by one or more modules or blocks in access management system 140. For example, operations performed by access management system 140 as described with reference to FIG. 3 may be performed by an authorization service that is implemented by access management system 140. In some embodiments, device 104 may include an application (e.g., a client or a browser) that performs some or all of the operations disclosed herein as being performed by device 104. In such embodiments, access management client 106 may be an application or a plug-in that runs with or embedded in a client or an application on device 104.

Figure 2:
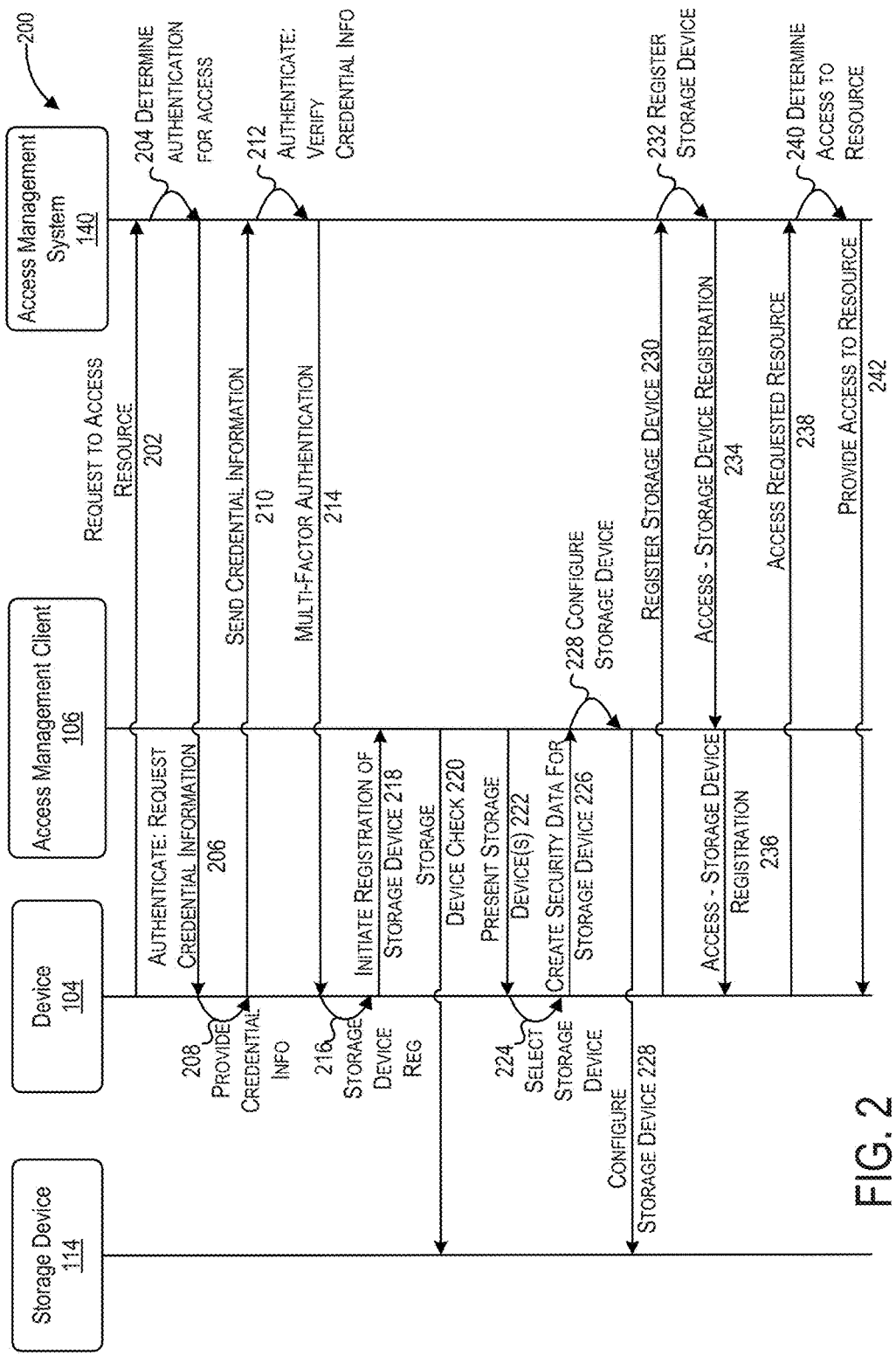
FIG. 2 illustrates a sequence diagram showing operations for registering a storage device as a security device for managing access to resources, in accordance with an embodiment.
Figure 3:
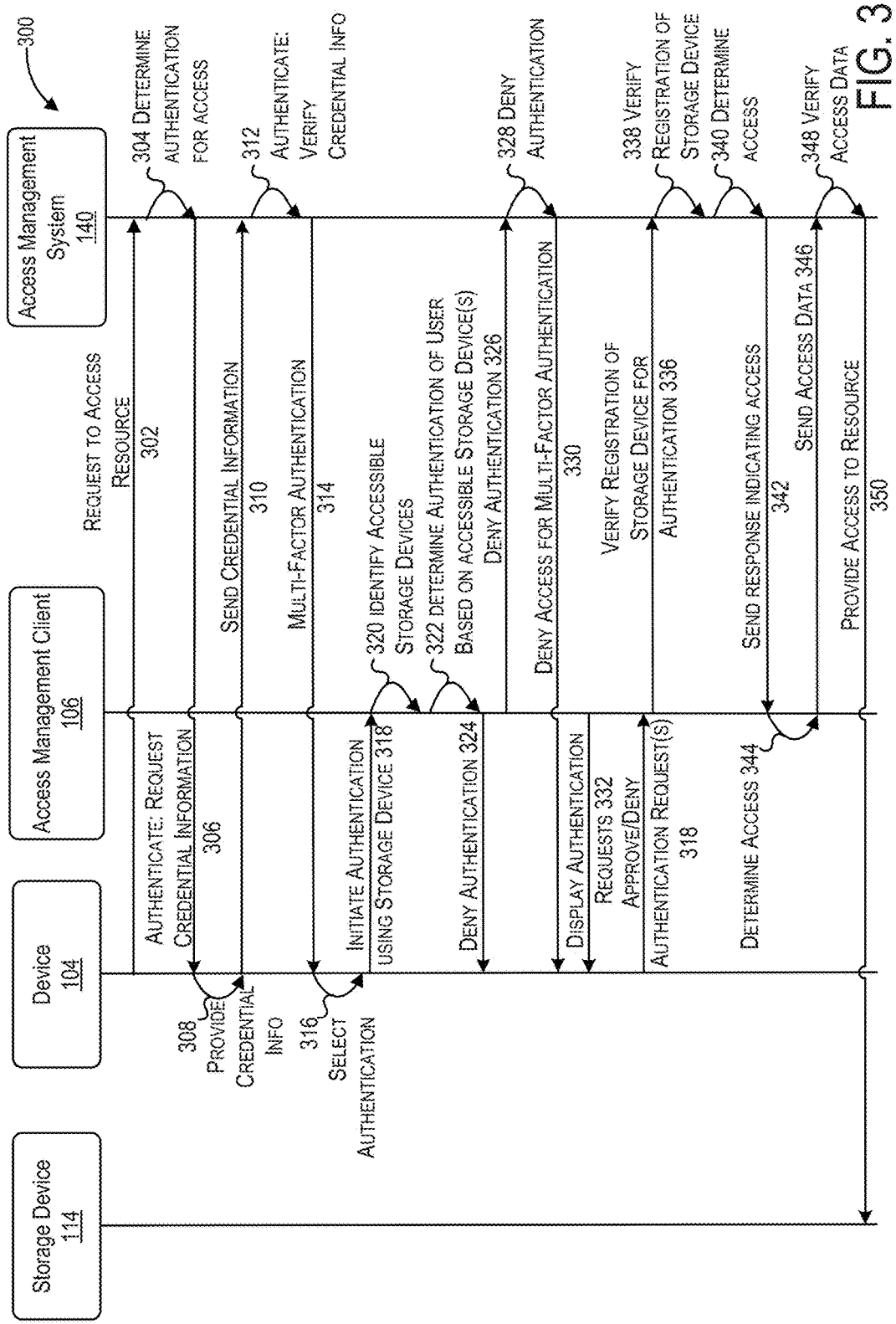
FIG. 3 illustrates a sequence diagram showing operations for using a storage device as a security device to access one or more resources, in accordance with an embodiment.

Similar to FIG. 2, at step 302, a user (e.g., user 102) may operate a client (e.g., device 104) to obtain access one or more resources in a computing environment, such as a cloud or an enterprise computing environment. Based on input by a user at device 104 to access a resource (e.g., input into a client or browser), a request to access a resource may be generated at device 104. The request may be sent to an access management system 140. A request for access to a resource may be generated at device 104 by device 104 or an application providing access to the resource.

In some embodiments, access to a resource may be managed by access management client 106. Access management client 106 may store data to manage requests for access to resources. Access management client 106 may determine authentication of a user for requests. Access management client 106 may manage requests including determining whether a user is authenticated based on a previous request. Requests may be process using a variety of access management techniques known in the art. Managing requests may include identifying requests and whether authentication of the user permits access to a resource that is requested.

In some embodiments, an application providing access to the requested resource, may communicate with access management client 106 to determine access permitted for a user. The request 302 may be generated by access management client 106 to determine access to the resource. A request sent to access management system 140 may include information about the user requesting access, information about device 104, or a combination thereof.

At step 304, access to a resource requested from device 104 may be determined for the user requesting the access. Determining access may include determining an authentication process for determining the access to a resource. Access may be permitted based on successful authentication of the user according to the authentication process. Based on determining authentication of the user, access management system 140 may determine authorization of the user to access the resource.

As part of authentication, access management system 140 may determine request information (e.g., a request identifier) about the request for the resource. The request information may be stored in association with the user. The request information may be later used by access management system 140 to determine whether a request to verify authentication of the user for a request based on a storage device accessible to the user's device 104.

The authentication process may be determined based on the resource requested for access. Access to a resource may be permitted based on a privileged to the user according to a role of the user. The authentication may be determined to include MFA, which includes verifying access credential information for the user.

At step 304, access management system 140 may implement an authentication process to determine access to a resource. The authentication process may include verifying credential information from the user at device 104. Access management system 140 may determine whether the user was previously authenticated for access. For example, access management system 140 may determine whether a session (e.g., a single sign-on session) exists for the user. Access management system 140 may determine whether access data (e.g., an access token or a cookie) is present or provided in the request received at step 302. Upon determining that the user has not authenticated to access the resource, access management system 140 may implement the authentication process.

At step 306, access management system 140 may request credential information from the user by sending a request to device 104. For example, access management system 140 may send a link to a web page to receive credential information. The web page pay be hosted by access management system 140 to ensure that credential information is obtained in a secure manner without intervention. A request may be sent to device 104 to request credential information. The request may be provided to the user at device 104 with the help of access management client 106. For example, access management client 106 may present the web page (e.g., a login web page) to the user at device 104. FIG. 4 illustrates an example of a graphical interface of a web page presented at device 104 to collect credentials. In some embodiments, a client or a browser on device 104 may display the web page.

At step 308, a user operating device 104 may provide input to the web page using device 104. The input may include credential information requested by access management system. At step 310, device 104 may send, to access management system 140, a request including credential information received at step 306.

At step 312, access management system 140 may receive the credential information sent at step 310. Access management system 140 may determine authentication of the user for the authentication process based on the credential information received. The authentication process may have been determined at step 304 for determining access to a resource.

In some embodiments, an authentication process may be determined based on a resource requested to be accessed. The authentication process may be determined based on a role of a user. The role of the user may be determined based on information in or associated with an account of the user to be verified for authentication based on the credential information. The authentication process may include MFA including authentication based on a data storage device (e.g., storage device 114) disclosed herein. The options for MFA may depend on the resource requested for access. In some embodiments, a user may be presented with authentication options to choose a type of authentication mechanism as part of the authentication process.

Authentication of the user based on the credential information may be determined by comparing the credential information to credential information previously created by the user for an account of the user. Successful authentication may be determined based on determining that the credential information matches the credential information previously created by the user for an account of the user.

At step 314, based on successful authentication of the user at step 312, access management system 140 may determine further authentication (e.g., MFA) of the user based on the authentication process determined for the user. Access management system 140 may include access management system 140 sending, to device 104, a request to determine a second authentication process as part of MFA for the authentication process to access a requested resource. The first authentication may be verification of the credential as discussed above. The request may include information about options of different authentication processes the user can select for the second authentication. The options may be presented to the user at device 104 in a client, such as an application, or browser. In at least one embodiment, access management system 140 may send, to device 104, a link to access a web page (e.g., a web page with options to initiate an authentication process for MFA) at device 104. The web page may be hosted by access management system 140 to ensure that any of the authentication processes are performed securely, and in accessible from non-authorized parties. FIG. 8 illustrates an example of a graphical interface of a web page presented at device 104 to present options for authentication processes, one of which includes an authentication process using a storage device as a hardware token for authentication.

In at least one embodiment, access management system 140 may determine that MFA for the authentication process includes authentication using a security device (e.g., a storage device) registered for the user as one factor of authentication. Access management system 140 may determine from an account of the user that a storage device has been registered as a security device for authentication. The request for further authentication based on MFA sent to device 104 may cause device 104 to present a graphical interface to enable a user to perform authentication using a storage device (e.g., storage device 114) registered as a security device. The request may include request information about the request for access to a resource. The request may include a web page as described above. In some embodiments, access management system 140 may send a request to access management client 106. The request may include the web page hosted by access management system 140. Access management client 106 may present a graphical interface to view one or more options for MFA.

At step 316, device 104 presents a graphical interface for performing further authentication according to a MFA process determined by access management system 140. The graphical interface may be presented by an application on device 104, such as access management client 106. At step 318, a user operating device 104 may interact with the graphical interface to provide input selecting a process for MFA. Based on determining that the user has selected the security device (e.g., hardware token) for authentication, access management client 106 may be requested to initiate authentication using a security device, such as storage device 114. In at least one example, device 104 may initiate an authentication request to access management client 106 to determine authentication based on a security device.

At step 320, access management client 106 may determine whether any storage devices are accessible to device 104. As disclosed herein, access management client 106 may use an interface or existing functions of device 104 to identify each storage device accessible to device 105. For example, access management client 106 may check each communication port of device 104 to identify connected or accessible storage devices. Storage devices accessible to device 104 may be identified to determine authentication of a user based on at least one accessible storage device registered as a security device for the user.

In some embodiments, access management client 106 may present one or more graphical interfaces that are interactive to receive input to select one of the accessible storage devices to use for authentication. In such an embodiment, the selected storage device may be verified for authentication. As a trusted application, access management client 106 can determine whether any given storage device is registered as a security device.

For each storage device that is identified, access management client 106 may determine whether the storage device is registered as a security device for a user. For a storage device, access management client 106 may obtain information about the storage device. The information about the storage device may include a device identifier of the storage device, a serial number of the storage device, a location of the storage device, and other information identifying the storage device. To determine that a storage device is registered, access management client 106 may generate security data for each storage device. For each storage device that is identified, access management client 106 may generate a unique security data (e.g., passkey) based on information unique to the storage device. For example, access management client 106 may generate a passkey based on device information, such as a device identifier and/or serial number. The generated security data can be used to verify whether the storage device has been registered as a security device.

At step 322, access management client 106 may access information (e.g., security data and device information) stored on each storage device to determine if any storage device has been properly registered for authentication of the user. Access management client 106 may access the storage on the storage device to determine if the storage device stores data expected to be stored for registration of the storage device. Access management client 106 can verify the data stored on a storage device for registration by generating data for registration in the same manner as registration. Because data stored on a storage device for registration may be generated in a secure manner and/or stored in a secure manner, access management client 106 can verify whether such data for registration is properly stored on a storage device.

In at least one embodiment, access management client 106 may access the storage device to determine if a key store on the storage device includes security data, and whether the security data matches that which should have been generated for registration of that storage device. Access management client 106 knowing the registration process, may first check whether the storage device has a key store that stores security data. Access management client 106 may access a key store on a storage device to be verified to determine whether security data is stored. Access management client 106 may access a file system (e.g., wallet file) on a storage device to determine whether the storage device has device information.

Based on determining that security data is stored in a key store for registration of a storage device, access management client 106 may decrypt the security data in a key store to determine whether the security data matches that which should have been generated by access management client 106 for registration of the storage device. For example, access management client 106 may determine whether data in a key store includes a key pair (e.g., public and private keys) generated for registration of the storage device. The security data may be decrypted using a decryption process for decrypting data according to an encryption process. For example, access management client 106 may generate a passkey to decrypt the security data stored in a key store on the storage device. Access management client may generate security data (e.g., decrypted security data), such as decrypted key data, based on decryption of the security data stored on the storage device. The passkey may be generated in a manner similar to registration, only known by access management client 106. For example, a passkey may be generated as a unique hash value. The hash value may be based on or using information (e.g., device information, serial number, volume information, etc.) about or related to the storage device to be registered for a user obtained at step 320. The data in a key store may verified to determine whether it includes security data based on decryption of the data using the passkey. Data may be verified based on determining that the decryption process in fact can decrypt the data stored in the key store.

Based on determining that data is stored in a file system (e.g., a wallet file) on a storage device for registration of the storage device, access management client 106 may attempt to decrypt the data. For registration of a storage device, data including device information may be stored on a storage device using techniques (e.g., encryption techniques) to protect the device information from being tampered or copied. The data may be verified based on whether it can be decrypted using a decryption process. The decryption process may be one corresponding to encryption used to store the data in the file system for registration of the storage device. For example, the data may be stored using a passkey that is uniquely generated for the storage device. A unique passkey may be generated using a technique known by access management client 106. In some embodiments, the passkey may be generated based on the device information about the storage device to be verified. The passkey may be used to access the device information stored on the storage device. The device information may be stored by encryption using the passkey. As such, the device information, if existing in the file system (e.g., a wallet file) on the storage device, can be determined by decrypting the information that was stored in the file system using an encryption technique based on the passkey. By decrypting the data successfully, access management client 106 can determine that the data is stored properly on the storage device.

The data may be verified by determining whether the data, after decryption, includes information about the storage device that should have been stored at registration. The data determined after decryption is compared to the device information identified at step 320 to determine whether the stored data matches. Access management client 106 may determine that the storage device is registered based on determining that the information stored in the file system matches the device information. If they match, then the storage device is verified as being the storage device that was registered as the device identified at step 320. In other words, the information about the device obtained at step 320 may be compared to the information obtained from the storage device to determine whether the information is the device information, stored in the manner for registration of the storage device.

Upon determining that the data is not stored on the storage device as disclosed herein for registration, then access management client 106 determines that the storage device is not registered with access management system 140 for authentication of the user. Upon determining that no storage device is registered for authentication with access management system 140, access management client 106 may perform operations to indicate authentication is not successful and to deny access based on authentication using a storage device for MFA.

At step 324, upon determining that no storage device is not registered with access management system 140, access management client 106 may send a message to device 104 or an application on device to indicate that the user is not authenticated. Access management client 106 may send one or more messages to indicate the storage devices that are not registered. A client or an application on device 104 may display information to the user that authentication is not successful based on any storage device. A client or an application on device 104 may display information indicating the storage devices accessible to device 104 could not be used for authentication.

At step 326, access management client 106 may also send a message to access management system 140. The message may include the request information and information indicating that the user is not authenticated upon determining that no storage device is registered for authentication. The request information enables access management system 140 to determine the request for a resource that should be denied based on unsuccessful authentication using a storage device as a hardware token.

At step 328, access management system 140 may store information indicating that the user is not authenticated to access a resource identified based on request information. At step 330, access management system 140 may send a message to device 104 to indicate that access is denied based on an attempt to authenticate using the storage devices accessible to device 104. The message may be sent to device 104 through access management client 106. The graphical interface presented at device may be updated to indicate that authentication was not successful.

At step 330, upon determining that a storage device selected for authentication is registered, security key data may be obtained from the storage device. Using a decryption process that enables access management client 106 to verify the security data in a key store on a registered storage device, security key data may be decrypted and accessed on the storage device. For example, a passkey generated by access management client 106 for the storage device may be used to decrypt the security data. The public key and private key may be identified in the security data as generated for registration of the storage device. The public key may have been provided to access management system 140 for secure communication between access management client and access management system 140.

In some embodiments, access management client 106 may store information about requests to authenticate a user for the storage device selected for authentication. The information for a request may include an identifier of the request, information about a resource for which access is requested, and a status of action indicating whether the request has been approved or denied. The information stored for the storage device may include an identifier (e.g., a hardware token name) of the storage device registered as a security device. At step 332, access management client 106 may present a graphical interface at device 104 showing information about requests to authenticate the user for a storage device that is selected. An example of such an interface is with reference to FIG. 9. The graphical interface may be interactive to enable a user to provide input to approve or deny each request. In some embodiments, the graphical interface may be interactive to enable auto-approval of each request to authenticate using the storage device. The graphical interface may display information about the storage device including an identifier of the storage device (e.g., a hardware token name) registered as a security device.

At step 334, access management client 106 may receive a request from device 104 based on input to the graphical interface to approve or deny a request. The request may indicate whether a specific request is approved or denied. The request may be associated with a request number associated with a request to access a resource. Access management client 106 may store information about the request including whether a request for authentication using a storage device is approved or denied.

At step 336, access management client 106 may communicate with access management system 140 to verify registration of the storage device with the access management system. In addition to verifying registration of a storage device, access management client 106 may communicate with access management system 140 to obtain pending requests for authentication using the storage device. Access management client 106 may obtain access data (e.g., an access token) to enable device 104 to access a requested resource based on authentication of a user by a storage device registered as a security device.

In at least one embodiment, access management client 106 may send a message (e.g., a request or verification call) to access management system 140 to verify the storage device, which was verified as registered at step 322. Authentication of the user may be based on verification of the storage device. The message may sent to request access to a requested resource based on authentication of a user by verifying the storage device. The message sent to access management system 140 may be generated by access management client 106. The message may be encrypted by an encryption process using the private key retrieved from the security data stored on the registered storage device. An encryption process may be implemented using one or more known encryption techniques, such as asymmetric cryptography. All or part of the message may be encrypted using the private key. Encrypting the message using the private key may ensure that only those systems with the public key can access the message. For example, the message may be decrypted by the access management system 140, which was provided with a public key during registration of the storage device.

In at least one embodiment, the information in the message may enable access management system 140 to determine whether the storage device is registered for a user requesting authentication based on the storage device. The message may include user information identifying a user requesting authentication using the storage device. The user information may be stored by access management system 140 in association with information about registration of a storage device. The message may include information about a request (e.g., a request identifier) for authentication associated with a specific resource. The information about the request may have been obtained from access management system 140 during a process for MFA. The message may indicate whether a request is approved or denied by a user. The message may include information identifying the storage device which is to be verified. The information identifying the storage device may include device information or may be a device data (e.g., a device token), which is uniquely generated for the storage device during its registration. The message may include a public key obtained from the security data stored on the storage device for which the request is being sent. The message may include information about a resource that is requested for access resulting in the MFA process.

At step 338, access management system 140 receives the message from access management client 106 requesting to verify registration of the storage device for authentication of a user. Access management system may access the information in the message by performing a decryption process. The information in the message may be used to determine the public key for the storage device. For example, the information about a storage device (e.g., device identifier) and the user (e.g., user identifier) may be used to locate data stored for registration of the storage device for a user. Access management system may verify a storage device is registered based on locating the data stored for registration of the storage device. The data stored for the storage device may be associated with a public key received from access management client 106 during registration. The public key may be used to read the message received from access management client 106. A decryption process may be performed using the public key to read the message. A determination may be made as to whether the message was decrypted. Such a determination may further provider verification that the storage device is registered. Access management system 140 may determine that the storage device is verified for registration based on determining that the storage device is registered for the user. Upon determining that the storage device is verified, access management system 140 can determine that the user associated with the storage device is authenticated based on the storage device registered as a security device. Access management system 140 may deny verification of the storage device upon determining that the message includes a request to deny authentication based on the storage device.

At step 340, based on determining that the storage device is registered, access management system determines whether authentication of the user permits the user to access the requested resource. Based on information read from the message, access management system 140 can determine the resource requested for access. For example, the request information in the message may be used to identify the initial request for access to a resource. The information about the user may be used to determine access to one or more resources. For example, the information about the user may be used to determine a role for access. A policy may be used to determine the user's access to the requested resource. Access management system 140 may permit or deny access based on determining the user's access to the resource.

Access management system 140 may send a response to access management client 106 indicating whether the user is permitted or denied to access a resource. The response may include access data to access the resource if access is permitted. In some embodiments, access management system 140 may generate the access data, such as an access token, based on determining the user is permitted to access the resource. An access token (e.g., a cookie) may be a token generated using techniques for access management known in the arts. The access token may include data to enable a client to access a resource permitted based on authentication.

At step 342, access management system 140 may send, to access management client 106, a response to a message requesting authentication of the user to access a resource. The response may include information indicating whether the storage device is registered as a security device. The response may include information indicating whether access to the resource is permitted based on whether the storage device is registered. In some embodiments, the response may include access data should access be permitted to the resource based on authentication of the user. The presence of access data in the response may be indicative of authorization to access a resource. The response may be encrypted with the public key identified at step 338. The encryption using the public key may enable the response to be securely communicated with access management client 106, which registered the storage device verified for authentication.

At step 344, access management client 106 may receive the response communicated at step 342. Access management client 106 may inspect the response to determine which request it is responsive to. A request identifier in the response provided by access management system 140 may be used by access management client 106 to identify a resource for which a request was made. Access management client 106 may have stored the request identifier in association with the user identifier for which authentication was requested based on a storage device registered as a security device. Access management client 106 may retrieve a private key obtained from the storage device that is authenticated. The response may be processed to identify the access data (e.g., access token) in the response. Based on the private key associated with the storage device authenticated for the user, the access data may be decrypted. The access data in the response may have been encrypted by access management system 140 using a public key corresponding to the private key for the storage device registered as a security device. The access data may be decrypted using the private key to generate decrypted access data. The access data may be successfully decrypted based on determining that the private key enables decryption of the access data.

At step 346, access management client 106 may store the access data on device 104 to enable device 104. The access data may enable device 104 to access a resource that is requested for which the user of device 104 is authenticated. Access management client 106, operating for a user on device 104, may send the access data to access management system 140 to access the resource initially requested at step 302.

At step 348, access management system 140 may determine access to a resource based on a request received with access data (e.g., access token) for the requested resource. Access management system 140 may verify the access data is that which was sent in a response to access management client 106 previously upon authentication of the user for MFA based on a storage device. Based on determining that the access data matches that which was sent in the response, access management system 140 may provide access to the requested resource (e.g., a URL or a web page). At step 350, access management system 140 may send a web page or a URL to access a resource that is permitted for access. A client or application on device 104 may display the access to the resource. For example, a graphical interface shown with reference to FIG. 7 may be displayed with the requested resource (e.g., a profile page of a human resources system).

IV. Interfaces for Authentication Using a Storage Device as a Security Device

FIGS. 4-9 illustrate interfaces, e.g., graphical interfaces for multi-factor authentication in an access management system, in accordance with an embodiment. The graphical interfaces may be displayed as part of an access portal, such as a web site, or in an application. Each of the graphical interfaces may be displayed at a device, e.g., device 104. For example, each of the graphical interfaces may be displayed by an access management application (e.g., access management client 106) that manages access to one or more resources. Each of the graphical interfaces may be accessed from access management system 140 or a may be part of an application accessed on a device in communication with access management system 140.

Now turning to FIG. 4 is a graphical interface 400 for receiving credential information (e.g., a user name and a password). Graphical interface 400 may be displayed at a device (e.g., device 104) as part of an authentication process. For example, graphical interface 400 may be displayed at a mobile device as part of MFA of a user. Graphical interface 400 may be displayed as part of authenticating a user for registering a storage device as a security device. Graphical interface 400 may be displayed as part of authenticating a user for MFA including authentication using a storage device as a security device. Graphical interface 400 may be displayed by access management client 106 as part of an authentication process.

Graphical interface 400 may be presented the first time a user operates a client device to obtain access to resources by authentication via access management system 140. Graphical interface 400 may be presented when a user requests access to a resource. Graphical interface 400 may be presented as part of an application, such as an access portal application or website, supporting access management system 140. Graphical interface 400 may be presented as part of one or more authentication processes for registering the client device for a user.

Graphical interface 400 may include one or more elements that are interactive to receive input (e.g., credential information) for an authentication process. Element 402 in graphical interface 400 may receive input for user identification (e.g., "User Name"). Element 404 in graphical interface 400 may receive input for credentials (e.g., "password"). Element 408 in graphical interface 400 may be interactive to submit a request to "login" for authentication based on input received in the elements. Element 406 in graphical interface 400 may be interactive to receive input to reset the fields for receiving the input in some or all elements of graphical interface 400.

Upon interaction with element 408, credential information input into graphical interface 400 may be sent from device 104 to access management system 140 for authentication. The credential information may be that which he user has previously provided for registration with access management system 140.

Figure 5:
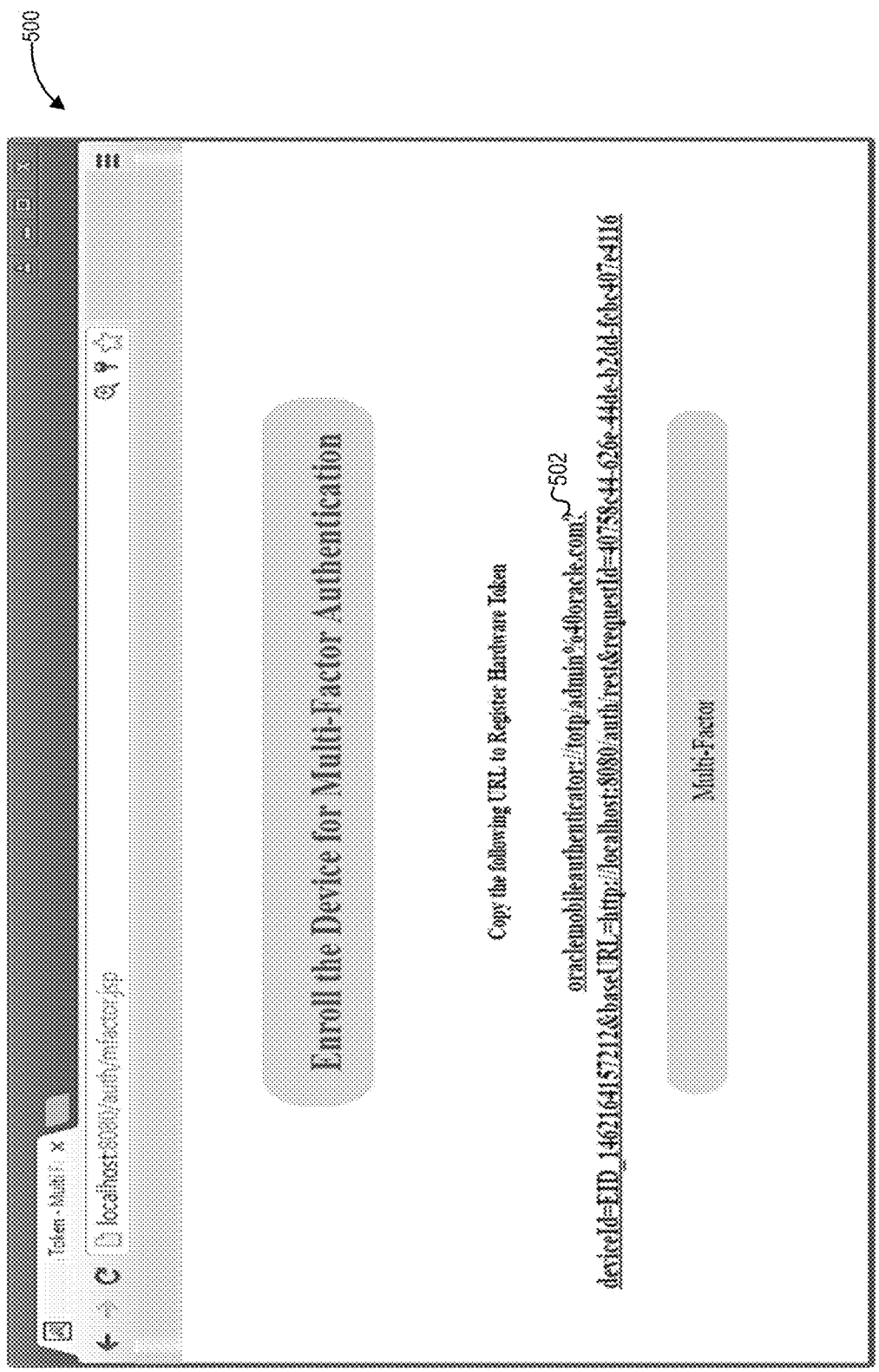
Figure 6:
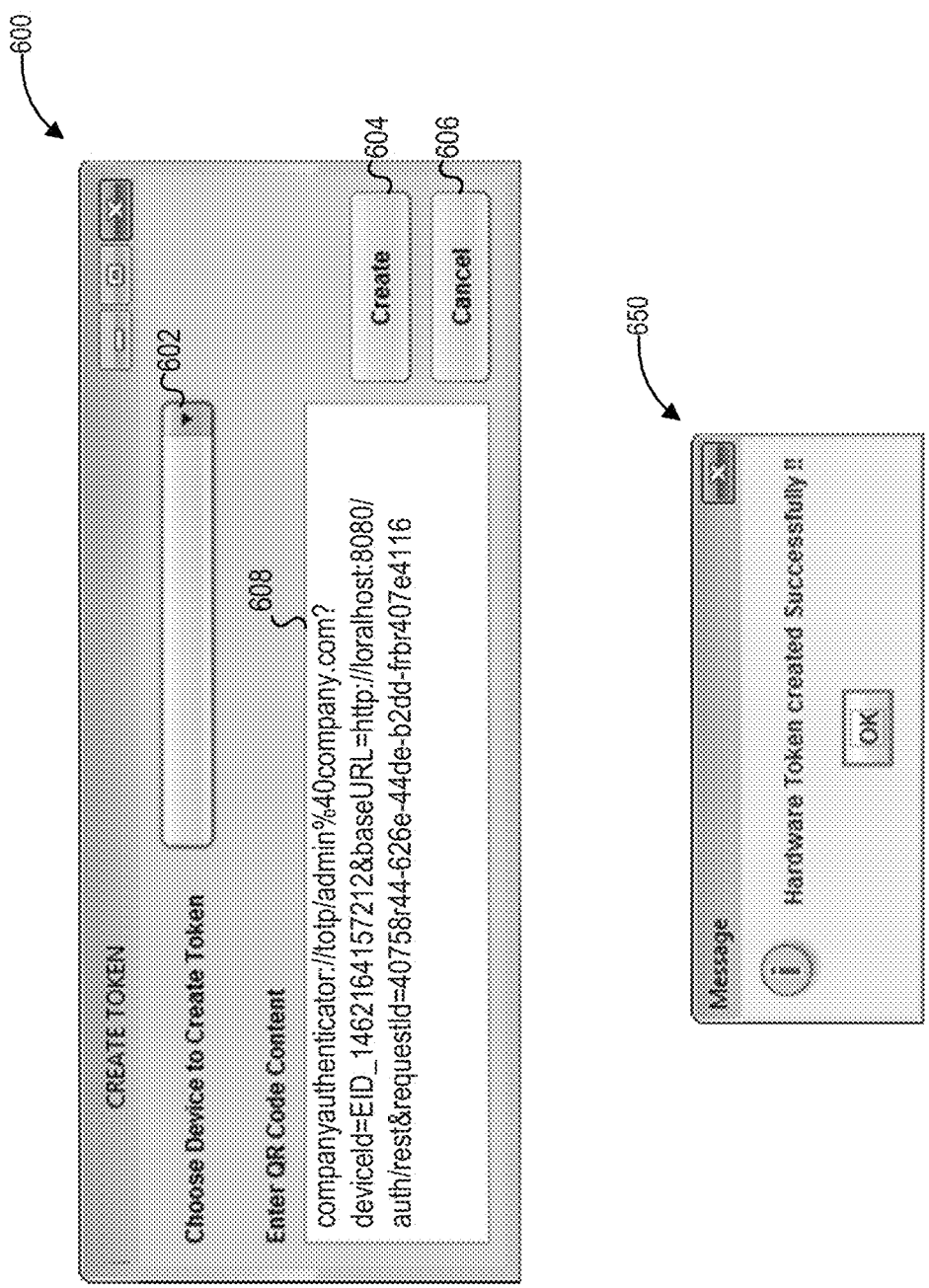

FIGS. 5 and 6 illustrate graphical interfaces for an authentication process of multi-factor authentication of a user for registration of a device as a trusted security device for password-less MFA. In some embodiments, graphical interface 500 may be displayed by access management client 106. Graphical interface 500 may be displayed during registration of a storage device as a security. For example, graphical interface 500 may display a status of registration of a storage device. As disclosed herein, access management system 140 may provide access data enabling a device to access a requested resource upon successfully completing registration of a storage device. The access data may include a URL to access a resource. The URL may be a redirect URL providing a location to access a resource upon successful registration of a storage device as a security device. In the example shown in FIG. 5. Graphical interface 500 may display an element 502 that is interactive to access the URL. Element 502 may be displayed as a link that is interactive to request the resource at the URL.

In some embodiments, the access data presented as element 502 in graphical interface 500 may be used to complete registration of a storage device before access to a resource is provided. The URL presented in the graphical interface, such as the example shown in FIG. 5 may be copied and entered into a graphical interface, such as a graphical interface shown in FIG. 6, to complete the registration of a storage device.

Now turning to FIG. 6, a graphical interface 600 is shown for receiving interaction to enable a user to register a storage device as a security device. Graphical interface 600 may include one or more elements that are interactive to receive input for registration of a storage device as a security device. Element 602 ("Choose Device to Create Token") in graphical interface 600 may be interactive to select one of the storage device(s) that are identified as being accessible to a device (e.g., 104) used for registration of a storage device. Graphical interface 600 may display whether any data storage devices are accessible at a device to register any of the data storage devices as a security device for authentication. Interaction with element 602 may cause a registration process to be initiated for the selected storage device. The input may be processed to identify the storage device that is selected.

As disclosed herein, registration of a storage device may include access management system 140 providing access data to access management client 106. Graphical interface 500 in FIG. 5 may display the access data, which can be used to complete registration of a storage device. In some embodiments, graphical interface 600 may include an element 608 ("Choose QR Code Content") to receive input, such as access data, to complete registration of a storage device. A user can provide access data, displayed as element 502 in FIG. 5, to element 608. Graphical interface 600 may include an element 604 ("Create") that is interactive to receive input to register the selected storage device as a security device. Interaction with element 604 may cause access management client 106 to communicate with access management system 140 to verify the access data entered in element 608. Access management client 106 may the access data to access management system 140 to determine whether the access data is the same as, or matches, that which was provided by access management system 140. Graphical interface 600 may include element 606 ("Cancel") that is interactive to request to cancel registration of the selected storage device.

In some embodiments, upon successful registration of a storage device, graphical interface 650 may be displayed to indicate a status of a storage device being registered a security device (e.g., a hardware token). In the example of FIG. 6, graphical interface 650 displays that a storage device is successfully registered as a hardware token.

Figure 7:
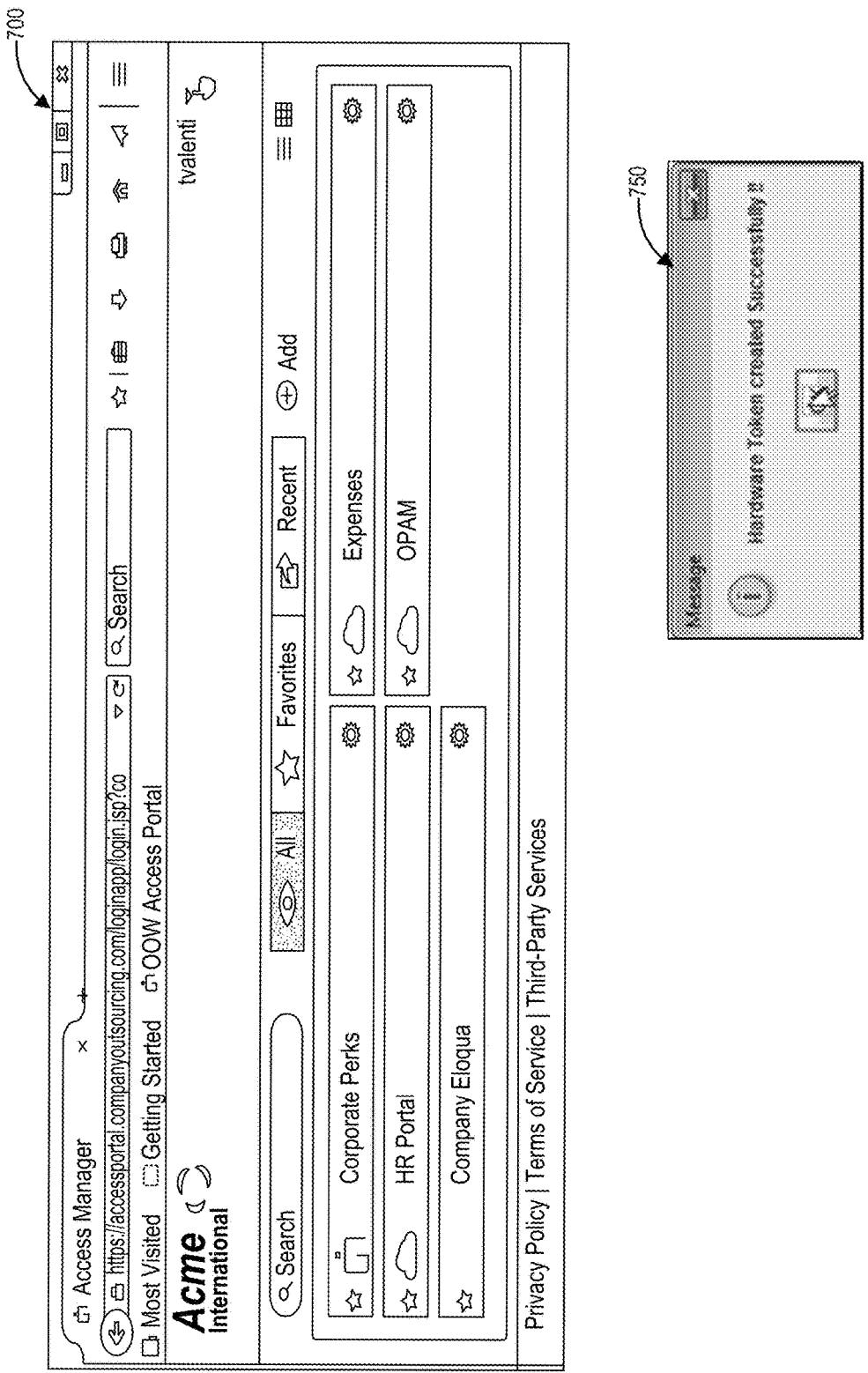

In FIG. 7, a graphical interface 700 is shown of a resource that is accessed upon successful authentication of a user using a storage device as a security device. Graphical interface 700 is shown providing access to a resource based on registration of a storage device using graphical interface 600. Graphical interface 700 may display the resource accessed using the access data obtained from authentication of a user based on a storage device registered as a security device for the user. In some embodiments, graphical interface 750 may be displayed to indicate a status of a storage device being registered a security device (e.g., a hardware token). In the example of FIG. 7, graphical interface 750 displays that a storage device is successfully registered as a hardware token.

Figure 9:
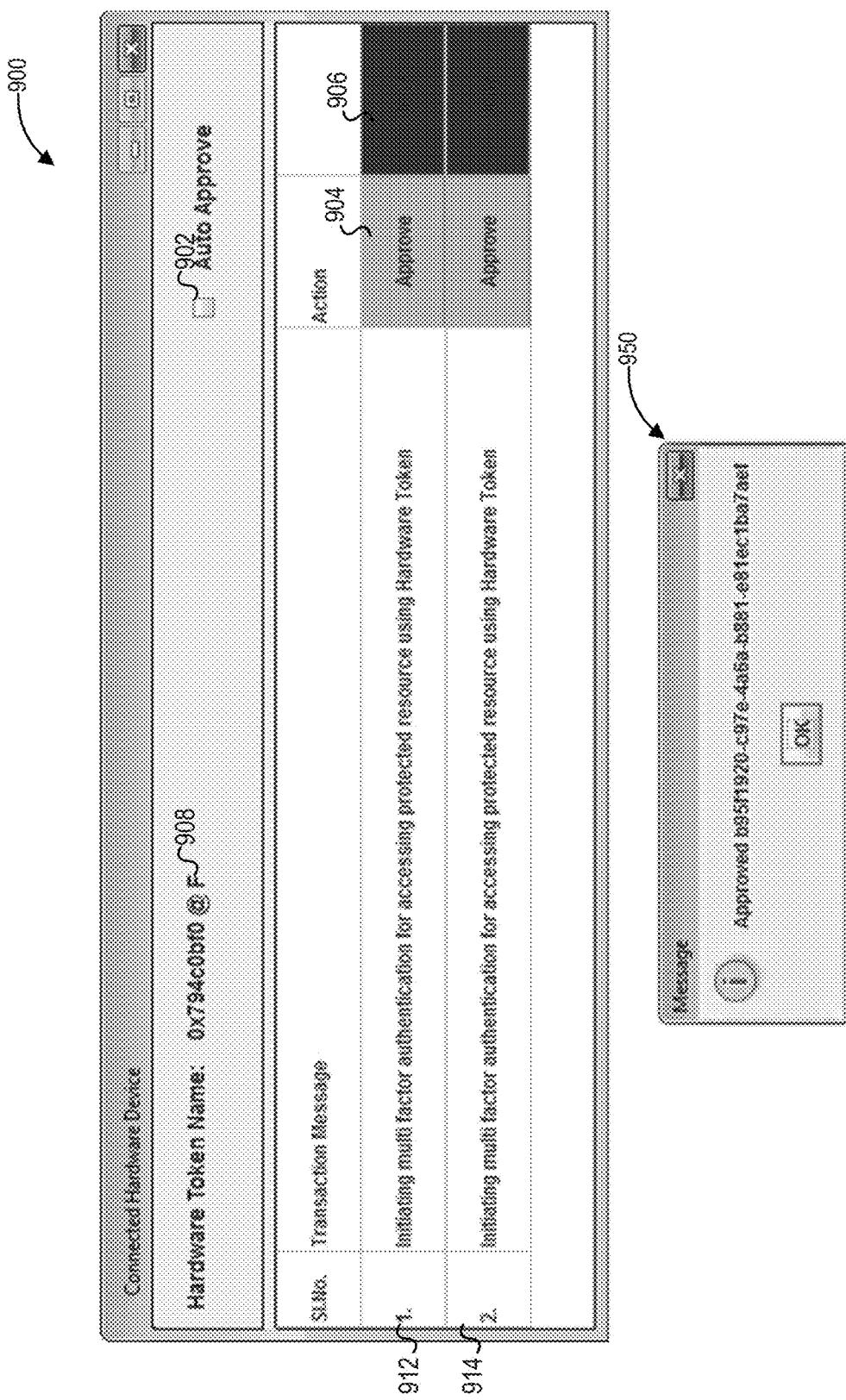

FIGS. 8 and 9 illustrate graphical interfaces for authentication of a user based on a storage device registered as a security device for the user. A graphical interface 800 is shown in FIG. 8 that displays options for authentication processes, one of which includes an authentication process using a storage device as a security device (e.g., a hardware token) for authentication. For example, graphical interface 800 may include one or more elements that are interactive to select one of the options for authentication. Each element may be interactive to receive input to select an option. Element 802 enables a user to select "hardware token" as an authentication process for authentication of a user based on a storage device registered as a security device (e.g., hardware token). Graphical interface 800 may be presented including features of the graphical interface shown in FIG. 5. One feature may include a status of authentication based on a storage device. Another feature may include displaying access data that is interactive for registration of a storage device. The access data may be displayed in a manner that is interactive to enable a resource to be accessed upon verification of a storage device.

FIG. 9 shows a graphical interface 900 for authenticating a user based on a storage device registered as a security device. Graphical interface 900 may show pending requests for authentication of a user based on a storage device that is registered as a security device. During authentication of a user, a storage device accessible to a client device may be selected to use for authentication of a user. Based on determining that a storage device is accessible to the client device, access management client 106 may perform a process to verify registration of the storage device as a security device. Graphical interface 900 may be displayed for a storage device based on determining that the storage device is registered with access management client 106. Verifying registration of the storage device may include extracting data stored on the storage device for a registration process. A device identifier (e.g., hardware token name) may be generated as a unique identifier of a storage device that is registered. The device identifier may be generated using information unique to the storage device. Graphical interface 900 may display an element 908 that presents the device identifier ("Hardware Token Name") for the storage device selected for determining authentication of a user.

Graphical interface 900 may display information about each unique request (e.g., a transaction) for authentication to enable access to a resource. Information about each request may be displayed using one or more elements, such as element 912 for a first request and element 914 for a second request. The information may include an identifier of the transaction and a transaction message that indicates the resource for which authentication is requested using the storage device identified by the device identifier.

Graphical interface 900 may include one or more elements corresponding to each element displayed for the request. For example, element 912 may be displayed with elements 904 and 906. Each element for a request may be interactive to perform an action (e.g., approve or deny) for the request. For example, for element 912, graphical interface may display element 904 that is interactive to enable a user to approve a request for authentication and may display an element 906 that is interactive to enable a user to deny a request for authentication. Graphical interface 900 enables a user to manage and control authentication for access to resources based on use of a storage device as a security device. Interaction with an element corresponding to an action may cause access management client 106 determine whether to proceed with authentication by communication with access management system 140. Denying a request for authentication may result in the authentication process being terminated. Approving a request for authentication may result in access management client 106 continuing with authentication of a user based on the storage device. Access management client 106 may communicate with access management system to verify authentication. In some embodiments, each of the requests for authentication may be based on information obtained from access management system 140. Access management system 140 may provide access management client 106 with a status of authentication for each request. Access management system 140 may proceed based on the action selected in graphical interface 900. Access management client 106 may communicate the action to access management system 140.

Graphical interface 900 may be useful to enable a user to view requests for resources that require authentication. As such, graphical interface 900 enables a user to view each resource for which authentication is required. In some embodiments, once a storage device is selected for authentication, access management client 106 may not request input from a user when determining authentication using a storage device for resources that demand further authentication. The graphical interface may be useful and enable a user to manage and control requests for authentication based on accessibility of a client device to a storage device.

In some embodiments, graphical interface 950 may be displayed to indicate a status of authentication. The status may be displayed with information related to an authentication request, such as a request identifier.

In some embodiments, graphical interface 900 may include an element 902 for configuring a process of approval of requests for authentication using a storage device. Element 902 may be interactive to receive input to configure an auto approval process by which some or all requests for access to a resource may be automatically approved ("auto-approved") to proceed with authentication based on the selected storage device.

V. Process for Registration of a Storage Device as a Security Device

Figure 10:
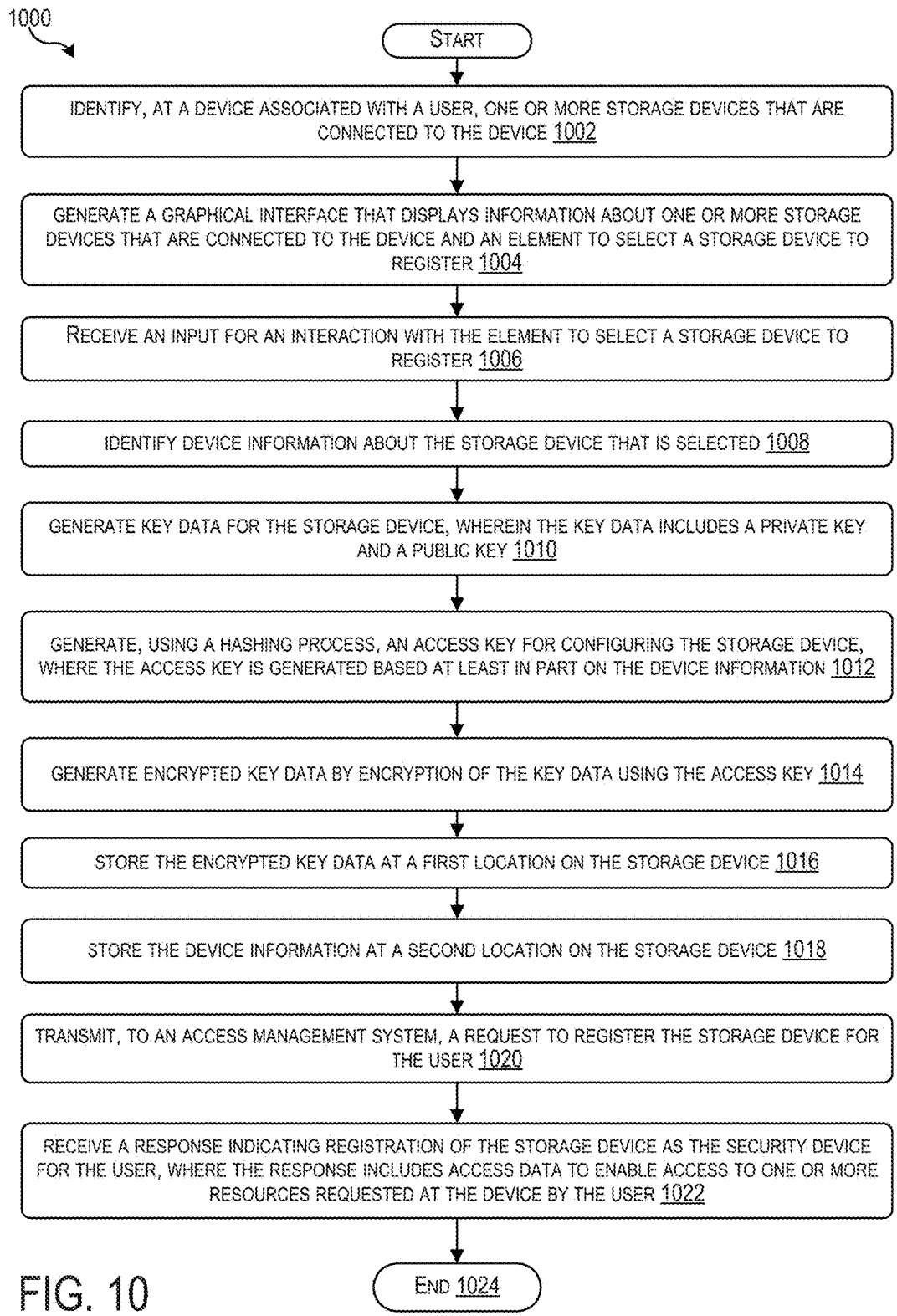
FIG. 10 illustrates an example of a flowchart of a process for registering a storage device as a security device for managing access to resources, in accordance with an embodiment according to some embodiments.

FIG. 10 illustrates a flowchart 1000 of a process for registration of a storage device as a security device, according to some embodiments. Process may be implemented at a device (e.g., device 104) by a client (e.g., access management client 106), which is configured to communicate with access management system 140. The process may include registering a storage device as trusted to enable the store device to be utilized as a security device for authentication.

Flowchart 1000 may begin at step 1002 by identifying one or more storage devices as being connected to a device associated with a user. For example, storage device 114 is identified as being connected to device 104 of FIG. 1 associated with user 102. Storage devices may be identified using an interface (e.g., a programming interface) on the device and/or functions of the device to determine if any storage devices are accessible to the device.

At step 1004, a graphical interface is generated. The graphical interface may be displayed at the device. The graphical interface may display information about each of the one or more storage devices that are identified as connected to the device. The graphical interface may include an element that is interactive to select at least one of the one or more storage devices for registration as a security device. At step 1006, an input for an interaction with the element is received. The input may correspond to a selection of a storage device from the one or more storage devices to register as the security device associated with a user.

At step 1008, device information about the storage device corresponding to the selection may be identified. An interface (e.g., a programming interface) for the storage device and/or functions of the storage device may be used to determine the device information. The storage device may store information that can be used to determine the device information. In some embodiments, a data source may be used to retrieve device information about the storage device. Device information may include a device identifier (e.g., a device serial number), device attributes (e.g., volume information), other information about the storage device, or a combination thereof. The device information may be unique to each storage device, such that the device information can be used for encryption and verification of the storage device for registration as a security device.

At step 1010, key data for the storage device may be generated. Key data may be generated as unique security data for each storage device that is generated. Key data may be generated using one or more techniques of encryption known for producing a pair of keys, such as a public key and a private key. The key data may be generated using techniques for asymmetric cryptography. The key data may be used to securely communicate with a server-side system, such as an access management system. The public key can be shared to enable the access management system to decrypt to read encrypted communication and to encrypt communication sent to a client-side application, such as access management client 106.

Data stored on a storage device being registered may be uniquely encrypted. The data may be encrypted so as to prevent tampering and transferring of the data to another storage device to spoof or replicate a storage device as a security device. Data may be encrypted using one or more techniques known in the art for cryptography. At step 1012, access key may be generated for configuring the storage device. The access key may be generated using a hashing process. For example, the access key may be generated as a hash value based on a hashing process using unique information about the device, such as all or part of the device information. The key data stored on the storage device may be encrypted using the access key. At step 1014, encrypted key day may be generated by encryption of the key data using the access key. Encrypted key data may be an encrypted form of the key data.

At step 1016, the key data in encrypted form, such as encrypted key data, may be stored at a location (e.g., a first location) on the storage device. The key data may be stored on the storage device in a secure manner, such as using encryption, to configure the storage device as a security device. For example, the encrypted key data may be stored at a first location, which is a key store on the storage device where an access management client may know to look for the key data.

At step 1018, device information may be stored at a location (e.g., a second location) on the storage device. The device information may be stored for configuration of the storage device as a security device. An access management client can determine that a storage device is registered a security device by identifying the device information on the storage device. The device information may be encrypted prior to storage to prevent tampering. For example, the device information may be encrypted using the access key generated at step 1012.

At step 1020, a request to register a storage device for a user may be sent to an access management system. For example, the request may be sent (e.g., transmitted) via one or more communication networks. The request may include key data, such as a public key and a private key, which are stored on the storage device. The public key and the private key may be stored, at the access management system, in association with user information about the user for registration of the storage device. The public key and the private key may be stored based on the request.

At step 1022, a response indicating registration of the storage device as the security device for the user is received. The response can include access data to enable access to one or more resources requested at the device by the user.

Flowchart 1000 ends at step 1024.

VI. Process for Verifying Registration of a Storage Device as a Security Device

Figure 11:
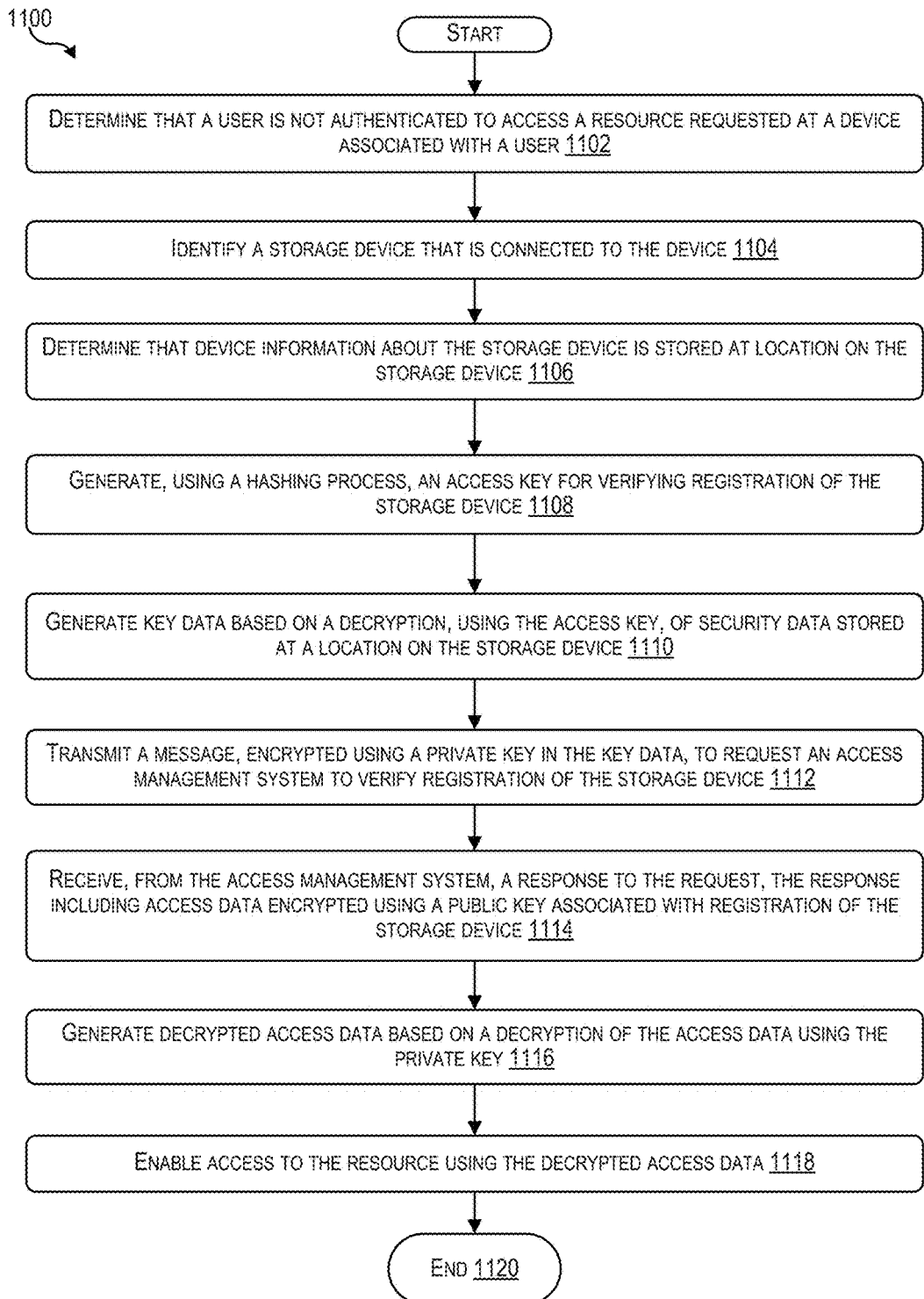
FIG. 11 illustrates an example of a flowchart of a process for using a storage device as a security device to access one or more resources, in accordance with an embodiment.

FIG. 11 illustrates a flowchart 1100 of a process for verifying registration of a storage device as a security device, according to some embodiments. Process may be implemented at a device (e.g., device 104) by a client (e.g., access management client 106), which is configured to communicate with access management system 140. The process may include verifying registration of a storage device as trusted to enable the store device to be utilized as a security device for authentication.

Flowchart 1100 may begin at step 1102 by determining that a user is not authenticated to access a resource requested at a device (e.g., device 104) associated with the user. An access management system may control access to the resource.

At step 1104, one or more storage device are identified as being connected to the device. Each storage device may be identified to verify registration of the storage device as a security device for authentication of the user.

At step 1106, device information about the identified storage device may be determined. The device information may be determined from a location (e.g., a first location) on the storage device. For example, the location may be in a file system. The device information may include an identifier of the storage device. The device information may be compared to information about the storage device based on accessing the storage device. The device information stored on the storage device may be decrypted based on information about the storage device determined by accessing the storage device.

In some embodiments, the device information may be accessed using an access key. The access key may be used to verify whether the device information stored on the storage device corresponds to device information about the storage device. Access management client 106 may identify information (e.g., device identifier and one or more attributes about the storage device) about the storage device from the device. An access key may be generated using a hashing process. The access key may be generated using the information about the storage device. The access key may be used to decrypt data stored at the first location. Upon successful decryption, it may be determined that the data stored at the first location is the correct device information for the storage device, thereby indicating that the storage device is properly registered.

In some embodiments, information stored at the location on the storage device may be compared with information about the device. Based on determining that information stored at the first location does not identify the storage device, a determination is made that the storage device is not registered because it does not store information about the storage device. Based on such a determination, authentication could not be determined using the storage device. Access to resources may be denied.

At step 1108, using a hashing process, an access key may be generated for verifying registration of the storage device. The access key may be generated based at least in part on the device information. A hashing process may include applying one or more hashing functions to determine a hash value as the access key. By using the device information, the access key may be generated uniquely for a specific storage device.

At step 1110, key data is generated based on a decryption (e.g., a first decryption process), using the access key, of security data stored at a location (e.g., a second location) on the storage device. The key data includes a private key and a public key. The decryption process may be similar, or corresponding to an encryption process used to encrypt the security data stored at the location. The security data may have been encrypted using the access key. Therefore, the security data may be decrypted using the same access key.

In some embodiments, decryption may be performed on the security data using the access key. A determination may be made whether the security data can be decrypted using the access key. Based on determining that the security data cannot be decrypted, a determination is made that the storage device is not registered with the access management system for the user. As such, access to resources may be denied because the user cannot be authenticated based on the storage device.

At step 1112, a message is transmitted to request an access management system to verify registration of the storage device as the security device. The message may be encrypted using the private key. The message may include user information about the user and the device information.

At step 1114, a response may be received from an access management system. The response may be responsive to the request to verify registration of the storage device. The response may include access data to enable access to the requested resource. The access data may be generated based on verifying that the storage device is registered with the access management system for the user. The access data may be encrypted using a public key associated with registration of the storage device for the user at the access management system.

At step 116, access data (e.g., decrypted access data) may be generated based on a decryption (e.g., a second decryption process) of the access data using the private key. In other words, an access management client can communicate with an access management system, where the access management client decrypts communications from the access management system using a private key. The communication from the access management system may be encrypted using a public key that corresponds to the private key.

At step 1118, the device can be enabled to access the resource using the decrypted access data. The access data may include a URL indicating a location to access the resource. The device can use the access data to request access to the resource. In some embodiments, the access data may include an access token (e.g., a cookie). The device can send a request including the access data to access to the resource through the access management system.

Flowchart 1100 ends at step 1120.

Figure 12:
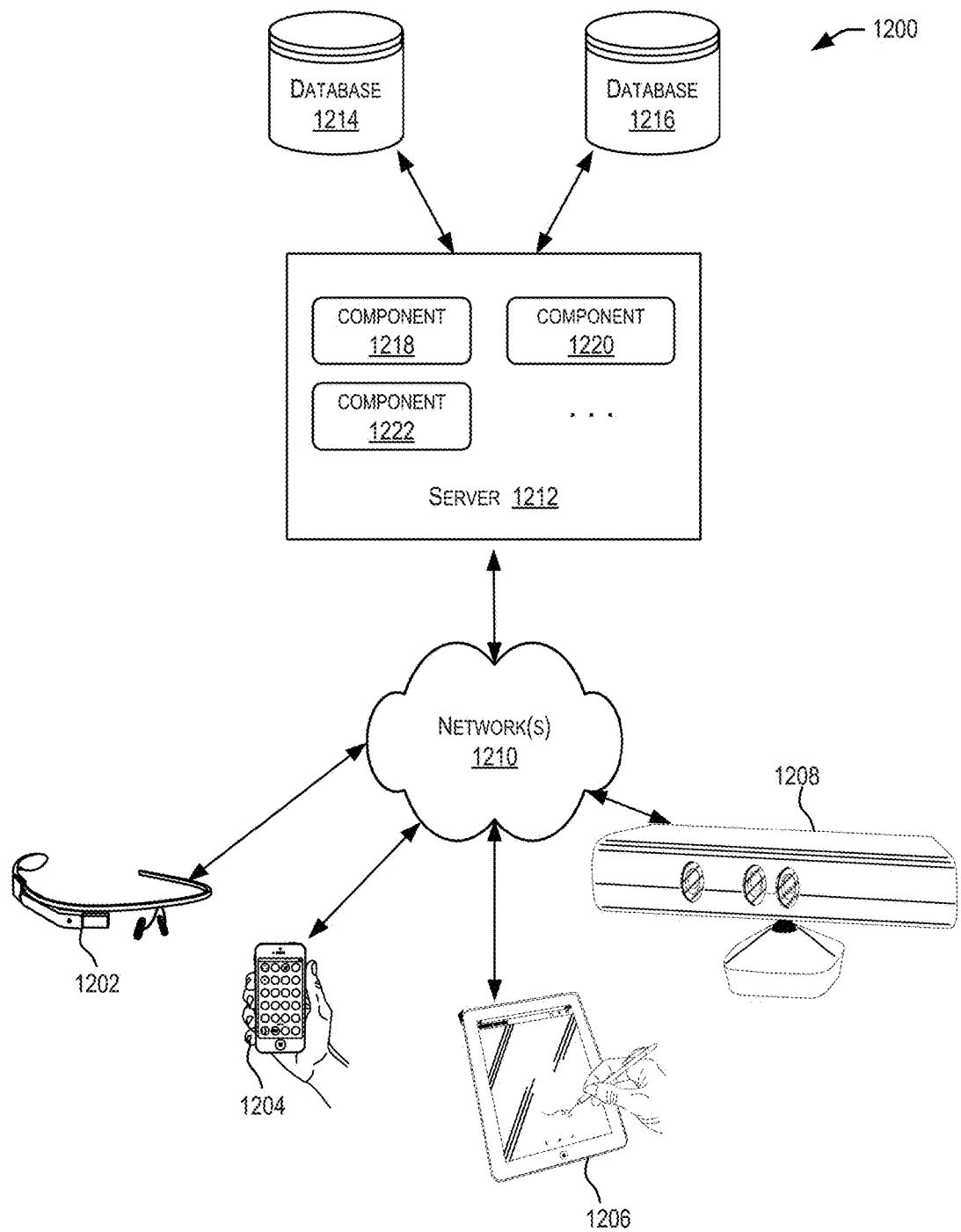
FIG. 12 depicts a simplified diagram of a distributed system for implementing an embodiment.

VII. General Computer Systems for an Access Management System and Client Systems FIG. 12 depicts a simplified diagram of a distributed system 1200 for implementing an embodiment. In the illustrated embodiment, distributed system 1200 includes one or more client computing devices 1202, 1204, 1206, and 1208, which are configured to execute and operate a client application such as a web browser, proprietary client (e.g., Oracle Forms), or the like over one or more network(s) 1210. Server 1212 may be communicatively coupled with remote client computing devices 1202, 1204, 1206, and 1208 via network 1210.

In various embodiments, server 1212 may be adapted to run one or more services or software applications. In certain embodiments, server 1212 may also provide other services or software applications can include non-virtual and virtual environments. In some embodiments, these services may be offered as web-based or cloud services or under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in FIG. 12, software components 1218, 1220 and 1222 of system 1200 are shown as being implemented on server 1212. In other embodiments, one or more of the components of system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in FIG. 12 is thus one example of a distributed system for implementing an embodiment system and is not intended to be limiting.

Client computing devices 1202, 1204, 1206, and/or 1208 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1210.

Although distributed system 1200 in FIG. 12 is shown with four client computing devices, any number of client computing devices may be supported. Other devices, such as devices with sensors, etc., may interact with server 1212.

Network(s) 1210 in distributed system 1200 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1210 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1212 can include one or more virtual machines running virtual operating systems, or other computing architectures involving virtualization. One or more flexible pools of logical storage devices can be virtualized to maintain virtual storage devices for the server. Virtual networks can be controlled by server 1212 using software defined networking. In various embodiments, server 1212 may be adapted to run one or more services or software applications described in the foregoing disclosure. For example, server 1212 may correspond to a server for performing processing as described above according to an embodiment of the present disclosure.

Server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more databases 1214 and 1216. These databases may provide a mechanism for storing information such as user interactions information, usage patterns information, adaptation rules information, and other information used by embodiments of the present disclosure. Databases 1214 and 1216 may reside in a variety of locations. By way of example, one or more of databases 1214 and 1216 may reside on a non-transitory storage medium local to (and/or resident in) server 1212. Alternatively, databases 1214 and 1216 may be remote from server 1212 and in communication with server 1212 via a network-based or dedicated connection. In one set of embodiments, databases 1214 and 1216 may reside in a storage-area network (SAN). Similarly, any necessary files for performing the functions attributed to server 1212 may be stored locally on server 1212 and/or remotely, as appropriate. In one set of embodiments, databases 1214 and 1216 may include relational databases, such as databases provided by Oracle that are adapted to store, update, and retrieve data in response to SQL-formatted commands.

Figure 13:
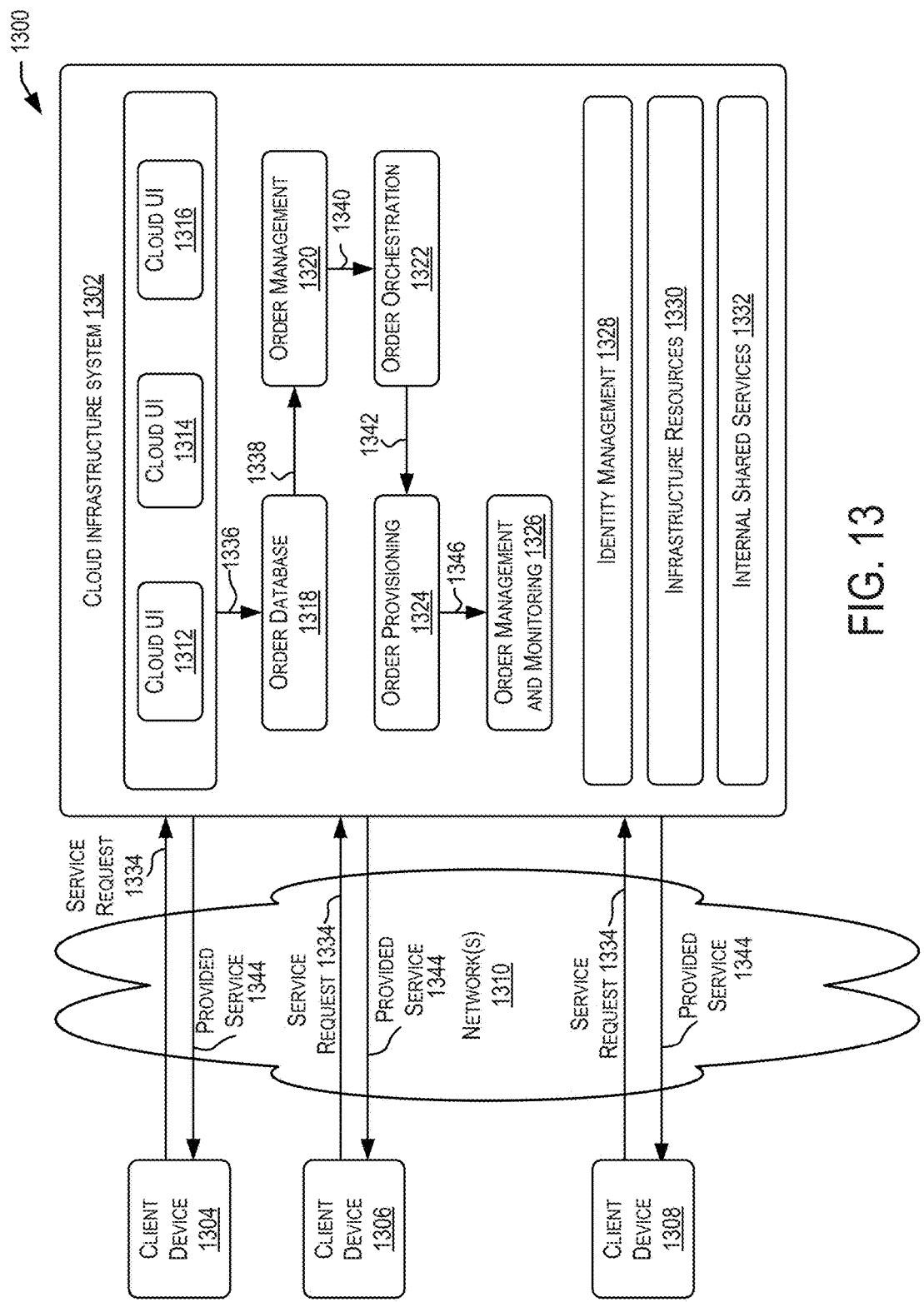
FIG. 13 illustrates a simplified block diagram of one or more components of a system environment in which services may be offered as cloud services, in accordance with an embodiment of the present disclosure.

In some embodiments, a cloud environment may provide one or more services. FIG. 13 is a simplified block diagram of one or more components of a system environment 1300 in which services may be offered as cloud services, in accordance with an embodiment of the present disclosure. In the illustrated embodiment in FIG. 13, system environment 1300 includes one or more client computing devices 1304, 1306, and 1308 that may be used by users to interact with a cloud infrastructure system 1302 that provides cloud services. Cloud infrastructure system 1302 may comprise one or more computers and/or servers that may include those described above for server 1212.

It should be appreciated that cloud infrastructure system 1302 depicted in FIG. 13 may have other components than those depicted. Further, the embodiment shown in FIG. 13 is only one example of a cloud infrastructure system that may incorporate an embodiment of the present disclosure. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for client computing devices 1202, 1204, 1206, and 1208. Client computing devices 1304, 1306, and 1308 may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302. Although exemplary system environment 1300 is shown with three client computing devices, any number of client computing devices may be supported. Other devices such as devices with sensors, etc. may interact with cloud infrastructure system 1302.

Network(s) 1310 may facilitate communications and exchange of data between client computing devices 1304, 1306, and 1308 and cloud infrastructure system 1302. Each network may be any type of network familiar to those skilled in the art that can support data communications using any of a variety of commercially-available protocols, including those described above for network(s) 1210.

In certain embodiments, services provided by cloud infrastructure system 1302 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1302 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1302 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle Corporation) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1302 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1302 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform, and other resources.

In some embodiments, resources in cloud infrastructure system 1302 may be shared by multiple users and dynamically re-allocated per demand. Additionally, resources may be allocated to users in different time zones. For example, cloud infrastructure system 1302 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 to enable provision of services by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1302, and the like.

In one embodiment, as depicted in FIG. 13, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In an exemplary operation, at step 1334, a customer using a client device, such as client computing devices 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI) such as cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

At step 1336, the order information received from the customer may be stored in an order database 1318. If this is a new order, a new record may be created for the order. In one embodiment, order database 1318 can be one of several databases operated by cloud infrastructure system 1302 and operated in conjunction with other system elements.

At step 1338, the order information may be forwarded to an order management module 1320 that may be configured to perform billing and accounting functions related to the order, such as verifying the order, and upon verification, booking the order.

At step 1340, information regarding the order may be communicated to an order orchestration module 1322 that is configured to orchestrate the provisioning of services and resources for the order placed by the customer. In some instances, order orchestration module 1322 may use the services of order provisioning module 1324 for the provisioning. In certain embodiments, order orchestration module 1322 enables the management of business processes associated with each order and applies business logic to determine whether an order should proceed to provisioning.

As shown in the embodiment depicted in FIG. 13, at step 1342, upon receiving an order for a new subscription, order orchestration module 1322 sends a request to order provisioning module 1324 to allocate resources and configure resources needed to fulfill the subscription order. Order provisioning module 1324 enables the allocation of resources for the services ordered by the customer. Order provisioning module 1324 provides a level of abstraction between the cloud services provided by cloud infrastructure system 1302 and the physical implementation layer that is used to provision the resources for providing the requested services. This enables order orchestration module 1322 to be isolated from implementation details, such as whether or not services and resources are actually provisioned on the fly or pre-provisioned and only allocated/assigned upon request.

At step 1344, once the services and resources are provisioned, a notification may be sent to the subscribing customers indicating that the requested service is now ready for use. In some instance, information (e.g. a link) may be sent to the customer that enables the customer to start using the requested services.

At step 1346, a customer's subscription order may be managed and tracked by an order management and monitoring module 1326. In some instances, order management and monitoring module 1326 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1300 may include an identity management module 1328 that is configured to provide identity services, such as access management and authorization services in cloud infrastructure system 1300. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

Figure 14:
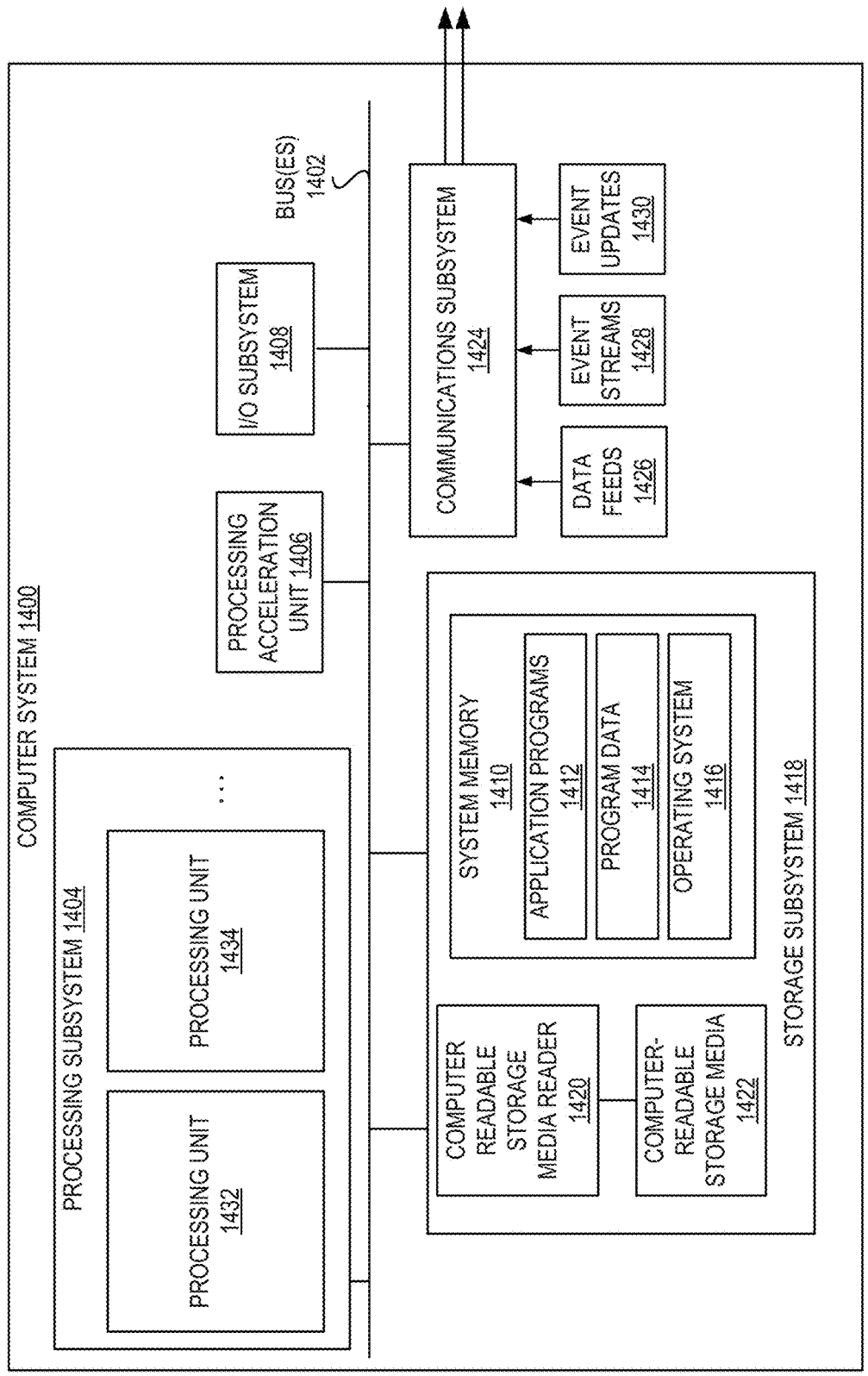
FIG. 14 illustrates an exemplary computer system that may be used to implement an embodiment of the present disclosure.

FIG. 14 illustrates an exemplary computer system 1400 that may be used to implement an embodiment of the present disclosure. In some embodiments, computer system 1400 may be used to implement any of the various servers and computer systems described above. As shown in FIG. 14, computer system 1400 includes various subsystems including a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 may include tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1404 controls the operation of computer system 1400 and may comprise one or more processing units 1432, 1434, etc. A processing unit may include be one or more processors, including single core or multicore processors, one or more cores of processors, or combinations thereof. In some embodiments, processing subsystem 1404 can include one or more special purpose co-processors such as graphics processors, digital signal processors (DSPs), or the like. In some embodiments, some or all of the processing units of processing subsystem 1404 can be implemented using customized circuits, such as application specific integrated circuits (ASICs), or field programmable gate arrays (FPGAs).

In some embodiments, the processing units in processing subsystem 1404 can execute instructions stored in system memory 1410 or on computer readable storage media 1422. In various embodiments, the processing units can execute a variety of programs or code instructions and can maintain multiple concurrently executing programs or processes. At any given time, some or all of the program code to be executed can be resident in system memory 1410 and/or on computer-readable storage media 1422 including potentially on one or more storage devices. Through suitable programming, processing subsystem 1404 can provide various functionalities.

In certain embodiments, a processing acceleration unit 1406 may be provided for performing customized processing or for off-loading some of the processing performed by processing subsystem 1404 so as to accelerate the overall processing performed by computer system 1400.

I/O subsystem 1408 may include devices and mechanisms for inputting information to computer system 1400 and/or for outputting information from or via computer system 1400. In general, use of the term "input device" is intended to include all possible types of devices and mechanisms for inputting information to computer system 1400. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1418 provides a repository or data store for storing information that is used by computer system 1400. Storage subsystem 1418 provides a tangible non-transitory computer-readable storage medium for storing the basic programming and data constructs that provide the functionality of some embodiments. Software (programs, code modules, instructions) that when executed by processing subsystem 1404 provide the functionality described above may be stored in storage subsystem 1418. The software may be executed by one or more processing units of processing subsystem 1404. Storage subsystem 1418 may also provide a repository for storing data used in accordance with the present disclosure.

Storage subsystem 1418 may include one or more non-transitory memory devices, including volatile and non-volatile memory devices. As shown in FIG. 14, storage subsystem 1418 includes a system memory 1410 and a computer-readable storage media 1422. System memory 1410 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1400, such as during start-up, may typically be stored in the ROM. The RAM typically contains data and/or program modules that are presently being operated and executed by processing subsystem 1404. In some implementations, system memory 1410 may include multiple different types of memory, such as static random access memory (SRAM) or dynamic random access memory (DRAM).

By way of example, and not limitation, as depicted in FIG. 14, system memory 1410 may store application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1422 may store programming and data constructs that provide the functionality of some embodiments. Software (programs, code modules, instructions) that when executed by processing subsystem 1404 a processor provide the functionality described above may be stored in storage subsystem 1418. By way of example, computer-readable storage media 1422 may include non-volatile memory such as a hard disk drive, a magnetic disk drive, an optical disk drive such as a CD ROM, DVD, a Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1422 may provide storage of computer-readable instructions, data structures, program modules, and other data for computer system 1400.

In certain embodiments, storage subsystem 1418 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for storing computer-readable information.

In certain embodiments, computer system 1400 may provide support for executing one or more virtual machines. Computer system 1400 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1400. Accordingly, multiple operating systems may potentially be run concurrently by computer system 1400. Each virtual machine generally runs independently of the other virtual machines.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to establish a communication channel to one or more client computing devices via the Internet for receiving and sending information from and to the client computing devices.

Communication subsystem 1424 may support both wired and/or wireless communication protocols. For example, in certain embodiments, communications subsystem 1424 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

Communication subsystem 1424 can receive and transmit data in various forms. For example, in some embodiments, communications subsystem 1424 may receive input communication in the form of structured and/or unstructured data feeds 1426, event streams 1428, event updates 1430, and the like. For example, communications subsystem 1424 may be configured to receive (or send) data feeds 1426 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1424 may be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1400 depicted in FIG. 14 is intended only as a specific example. Many other configurations having more or fewer components than the system depicted in FIG. 14 are possible. Based on the disclosure and teachings provided herein, a person of ordinary skill in the art will appreciate other ways and/or methods to implement the various embodiments.

Although specific embodiments of the present disclosure have been described, various modifications, alterations, alternative constructions, and equivalents are also encompassed within the scope of the present disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A non-transitory computer-readable memory storing a plurality of instructions executable by one or more processors, the plurality of instructions comprising instructions configured to cause the one or more processors to perform processing comprising:
   determining that a user associated with a device is not authenticated to access a resource requested at the device, wherein access to the resource is controlled by an access management system;
   identifying a storage device that is connected to the device, wherein the storage device is identified to verify registration of the storage device as a security device for authentication of the user;
   determining that device information about the storage device is stored at a first location on the storage device, wherein the device information includes an identifier of the storage device;
   generating, using a hashing process, an access key for verifying registration of the storage device, wherein the access key is generated based at least in part on the device information;
   generating key data based on a first decryption, using the access key, of security data stored at a second location on the storage device, wherein the key data includes a private key;
   transmitting a message to request the access management system to verify registration of the storage device as the security device, wherein the message is encrypted using the private key, and wherein the message includes user information about the user and the device information;
   receiving, from an access management system, a response to the request to verify registration of the storage device, wherein the response includes access data to enable access to the resource requested at the device, wherein the access data is generated based on verifying that the storage device is registered with the access management system for the user, and wherein the access data is encrypted using a public key associated with registration of the storage device for the user at the access management system;
   generating decrypted access data based on a second decryption of the access data using the private key; and
   enabling access to the resource using the decrypted access data.

2. The non-transitory computer-readable memory of claim 1, wherein the first location is a file system located on the storage device, and wherein the second location is a key store located on the storage device.

3. The non-transitory computer-readable memory of claim 1, wherein the device information includes one or more attributes about the storage device.

4. The non-transitory computer-readable memory of claim 1, wherein the processing further comprises:
   identifying information about the storage device;
   generating, using a hashing process, an access key verifying that the device information is stored on the storage device, wherein the access key is generated based at least in part on the information about the storage device; and obtaining, using the access key, the device information at the first location.

5. The non-transitory computer-readable memory of claim 1, wherein the device includes a computer, wherein the storage device is included in a computer system, and wherein the storage device is connected to the device via a communication network.

6. The non-transitory computer-readable memory of claim 1, wherein the device is a mobile communication device, and wherein the storage device is a computer-readable storage media that is physically connected to the device.

7. The non-transitory computer-readable memory of claim 1, wherein the verifying the storage device is registered with the access management system includes determining that the device information is stored in association with the user information.

8. The non-transitory computer-readable memory of claim 1, wherein the processing further comprises:
based on determining that information stored at the first location does not identify the storage device, determining that the storage device is not registered with the access management system for the user; and
denying access to the resource at the device.

9. The non-transitory computer-readable memory of claim 1, wherein the processing further comprises:
performing the first decryption of the security data using the access key;
based on determining that the security data cannot be decrypted using the access key, determining that the storage device is not registered with the access management system for the user; and
denying access to the resource at the device.

10. A system comprising:
one or more processors;
a memory coupled to the one or more processors, the memory storing a plurality of instructions executable by the one or more processors, the plurality of instructions comprising instructions configured to cause the one or more processors to perform processing comprising:
identifying, at a device associated with a user, one or more storage devices that are connected to the device;
generating a graphical interface that is displayed at the device, wherein the graphical interface displays information about each of the one or more storage devices that are identified as connected to the device, and wherein the graphical interface includes an element that is interactive to select at least one of the one or more storage devices for registration as a security device;
receiving an input for an interaction with the element, wherein the input corresponds to a selection of a storage device from the one or more storage devices to register as the security device associated with a user;
identifying device information about the storage device corresponding to the selection, wherein the device information includes an identifier of the storage device;
generating key data for the storage device, wherein the key data includes a private key and a public key;
generating, using a hashing process, an access key for configuring the storage device, wherein the access key is generated based at least in part on the device information;
generating encrypted key data by encryption of the key data using the access key;
storing the encrypted key data at a first location on the storage device;
storing the device information at a second location on the storage device;
transmitting, to an access management system, a request to register the storage device for the user, the request including the public key and device information, wherein based on the request, the public key and device information are stored at the access management system in association with user information about the user for registration of the storage device; and
receiving, from the access management system, a response indicating registration of the storage device as the security device for the user, wherein the response includes access data to enable access to one or more resources requested at the device by the user.

11. The system of claim 10, wherein the storage device is included in a computer system, and wherein the storage device is connected to the device via a communication network.

12. The system of claim 10, wherein the storage device is a computer-readable storage media that is physically connected to the device.

13. The system of claim 10, wherein the first location is a key store located on the storage device, and wherein the second location is a file system located on the storage device.

14. The system of claim 10, wherein the device information includes one or more attributes about the storage device.

15. A non-transitory computer-readable memory storing a plurality of instructions executable by one or more processors, the plurality of instructions comprising instructions configured to cause the one or more processors to perform processing comprising:
identifying, at a device associated with a user, one or more storage devices that are connected to the device;
generating a graphical interface that is displayed at the device, wherein the graphical interface displays information about each of the one or more storage devices that are identified as connected to the device, and wherein the graphical interface includes an element that is interactive to select at least one of the one or more storage devices for registration as a security device;
receiving an input for an interaction with the element, wherein the input corresponds to a selection of a storage device from the one or more storage devices to register as the security device associated with a user;
identifying device information about the storage device corresponding to the selection, wherein the device information includes an identifier of the storage device;
generating key data for the storage device, wherein the key data includes a private key and a public key;
generating, using a hashing process, an access key for configuring the storage device, wherein the access key is generated based at least in part on the device information;
generating encrypted key data by encryption of the key data using the access key;
storing the encrypted key data at a first location on the storage device;
storing the device information at a second location on the storage device;
transmitting, to an access management system, a request to register the storage device for the user, the request including the public key and device information, wherein based on the request, the public key and device information are stored at the access management system in association with user information about the user for registration of the storage device; and receiving, from the access management system, a response indicating registration of the storage device as the security device for the user, wherein the response includes access data to enable access to one or more resources requested at the device by the user.

16. The non-transitory computer-readable memory of claim 15, wherein the storage device is included in a computer system, and wherein the storage device is connected to the device via a communication network.

17. The non-transitory computer-readable memory of claim 15, wherein the storage device is a computer-readable storage media that is physically connected to the device.

18. The non-transitory computer-readable memory of claim 15, wherein the first location is a key store located on the storage device, and wherein the second location is a file system located on the storage device.

19. The non-transitory computer-readable memory of claim 15, wherein the device information includes one or more attributes about the storage device.

\* \* \* \* \*

UNITED STATES PATENT AND TRADEMARK OFFICE
CERTIFICATE OF CORRECTION

PATENT NO. : 10,462,142 B2
APPLICATION NO. : 16/183047
DATED : October 29, 2019
INVENTOR(S) : Pattar et al.

Page 1 of 1

It is certified that error appears in the above-identified patent and that said Letters Patent is hereby corrected as shown below:

On the Title Page

In Column 1, under (73) Assignee, Line 2, after "Shores" insert -- , CA (US) --.

In the Specification

In Column 7, Line 5, delete "Preferrably," and insert -- Preferably, --, therefor.

In Column 8, Line 3, delete "mange" and insert -- manage --, therefor.

In Column 17, Line 36, after "authentication" insert -- . --.

In Column 21, Line 30, after "permitted" insert -- . --.

In Column 31, Line 65, delete "he" and insert -- the --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*